United States Patent
Duan et al.

(10) Patent No.: US 12,131,683 B2
(45) Date of Patent: Oct. 29, 2024

(54) METHOD AND DEVICE FOR CLOCK CALIBRATION, AND STORAGE MEDIUM

(71) Applicants: Beijing BOE Display Technology Co., Ltd., Beijing (CN); BOE Technology Group Co., Ltd., Beijing (CN)

(72) Inventors: Xin Duan, Beijing (CN); Jigang Sun, Beijing (CN); Shaolei Zong, Beijing (CN); Wei Sun, Beijing (CN)

(73) Assignees: Beijing BOE Display Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 509 days.

(21) Appl. No.: 17/497,920

(22) Filed: Oct. 9, 2021

(65) Prior Publication Data
US 2022/0114944 A1    Apr. 14, 2022

(30) Foreign Application Priority Data
Oct. 9, 2020   (CN) .......................... 202011074390.9

(51) Int. Cl.
G09G 3/20    (2006.01)
G06F 1/08    (2006.01)
G06F 1/12    (2006.01)
G06F 1/14    (2006.01)

(52) U.S. Cl.
CPC ............. *G09G 3/2092* (2013.01); *G06F 1/08* (2013.01); *G06F 1/12* (2013.01); *G06F 1/14* (2013.01); *G09G 2310/08* (2013.01); *G09G 2340/0435* (2013.01)

(58) Field of Classification Search
CPC ............. G09G 3/2092; G09G 2310/08; G09G 2340/0435; G09G 2310/0221; G09G 2320/0693; G09G 3/20; G06F 1/08; G06F 1/12; G06F 1/14; H03K 5/156
See application file for complete search history.

(56) References Cited

U.S. PATENT DOCUMENTS

| | | | |
|---|---|---|---|
| 2014/0184582 A1* | 7/2014 | Shie | G09G 3/20 345/213 |
| 2019/0173457 A1* | 6/2019 | Huang | G09G 3/2096 |
| 2021/0065634 A1* | 3/2021 | Pyun | H03L 7/081 |

* cited by examiner

*Primary Examiner* — Kyu Chae
(74) *Attorney, Agent, or Firm* — IPro, PLLC

(57) ABSTRACT

A method for clock calibration is provided. In the technical solution according to the present disclosure, a target driving chip includes a plurality of clock calibration circuits, wherein each of the clock calibration circuits is configured with one clock frequency. Prior to sending a clock calibration signal, a controller sends a reference clock frequency to a driving chip over a configuration instruction, such that the driving chip determines a target clock calibration circuit for clock calibration based on the configuration instruction.

20 Claims, 11 Drawing Sheets

METHOD AND DEVICE FOR CLOCK CALIBRATION, AND STORAGE MEDIUM

CROSS-REFERENCE TO RELATED APPLICATION

This application is based on and claims priority to Chinese Patent Application No. 202011074390.9, filed on Oct. 9, 2020 and titled "METHOD AND DEVICE FOR CLOCK CALIBRATION," the disclosure of which is incorporated herein by reference in its entirety.

TECHNICAL FIELD

The present disclosure relates to the field of display technologies, and in particular relates to a method and device for clock calibration, and a storage medium thereof.

BACKGROUND

A display device may include a display panel, and a panel driving circuit for driving the display panel. The panel driving circuit may include a timing controller (TCON), a gate driver on array (GOA) circuit, and a source driver circuit. The source driver circuit includes a plurality of driving chips. The TCON may be communicated with the driving chips by using a point-to-point interface communication technology.

SUMMARY

Embodiments of the present disclosure provide a method and device for clock calibration, and a storage medium thereof.

In a first aspect of the embodiments of the present disclosure, a method for clock calibration is provided. The method is applicable to a controller, and the method includes:
  sending display data to a target driving chip based on an initial clock frequency, the target driving chip including a plurality of clock calibration circuits, each of the clock calibration circuits being configured with one clock frequency;
  sending a configuration instruction to the target driving chip, the configuration instruction including a reference clock frequency; and
  sending a clock calibration signal of a first target clock frequency to the target driving chip, the first target clock frequency being different from the initial clock frequency, wherein
  the configuration instruction is configured to instruct the target driving chip to adjust a local clock frequency of the target driving; chip to the first target clock frequency by a target clock calibration circuit; and a difference between a clock frequency configured for the target clock calibration circuit and the reference dock frequency is less than a difference between a clock frequency configured for other clock calibration circuits in the target driving chip and the reference dock frequency.

In some embodiments, sending the clock calibration signal of the first target clock frequency to the target driving chip includes:
  sending the clock calibration signal of the first target clock frequency to the target driving chip within one first synchronization cycle; and
  repeating the step of sending the clock calibration signal of the first target clock frequency within one first synchronization cycle in the case that a first feedback signal configured to indicate completion of calibration of the first target clock frequency is not received from the target driving chip, until the first feedback signal is received.

In some embodiments, in the case that the number of repetitions of the first synchronization cycle is greater than a number threshold, the method further includes:
  continuously sending the clock calibration signal of the first target clock frequency to the target driving chip until the first feedback signal is received; or
  sending the clock calibration signal of the first target clock frequency to the target driving chip within one second synchronization cycle, and repeating the step of sending the clock calibration signal of the first target clock frequency within the second synchronization cycle in the case that the first feedback signal from the target driving chip is not received, until the first feedback signal is received, wherein a length of the second synchronization cycle is greater than a length of the first synchronization cycle.

In some embodiments, the reference clock frequency is equal to the first target clock frequency.

In some embodiments, prior to sending the clock calibration signal of the first target clock frequency to the target driving chip, the method further includes:
  sending a clock calibration signal of a second target clock frequency to the target driving chip; and
  sending the clock calibration signal of the first target clock frequency to the target driving chip includes:
  sending the clock calibration signal of the first target clock frequency to the target driving chip in the case that a second feedback signal configured to indicate completion of calibration of the second target clock frequency is received from the target driving chip, wherein
  the initial clock frequency, the second target clock frequency, and the first target clock frequency are sequentially increased or decreased.

In some embodiments, a difference between the first target dock frequency and the second target clock frequency is equal to a difference between the second target clock frequency and the initial dock frequency.

In some embodiments, the reference clock frequency is equal to the second target clock frequency.

In some embodiments, in response to sending the clock calibration signal of the first target clock frequency to the target driving chip, the method further includes: sending a link stable pattern (LSP) to the target driving chip in the case that the first feedback signal configured to indicate completion of calibration of the first target clock frequency is received from the target driving chip.

In some embodiments, the controller is connected to a plurality of driving chips which are connected to a display panel, wherein each of the driving chips is configured to drive a display region in the display panel. The method further includes:
  determining that a resolution and/or a refresh rate of a target display region in the display panel need/needs to be adjusted; and
  determining a driving chip configured to drive the target display region as the target driving chip.

In some embodiments, the display data includes a plurality of rows of pixel data corresponding to a plurality of rows of pixels one by one; and sending display data to the target driving chip based on the initial clock frequency includes:

sending the pixel data to the target driving chip row by
row based on the initial clock frequency in a displaying
phase;
sending the configuration instruction to the target driving
chip includes:
sending the configuration instruction to the target driving
chip in response to the sending of the pixel data in the
last row in the displaying phase; and
sending the clock calibration signal of the first target clock
frequency to the target driving chip includes:
sending the clock calibration signal of the target clock
frequency to the target driving chip in a blanking phase
upon the displaying phase.

In a second aspect of the embodiments of the present disclosure, a method for clock calibration is provided. The method is applicable to a controller, and the method includes:
sending display data to a target driving chip based on an initial clock frequency;
sending a clock calibration signal of a second target clock frequency to the target driving chip; and
sending the clock calibration signal of a first target clock frequency to the target driving chip in the case that a feedback signal configured to indicate completion of calibration of the second target clock frequency is received from the target driving chip, wherein
the initial clock frequency, the second target clock frequency, and the first target clock frequency are sequentially increased or decreased.

In a third aspect of the embodiments of the present disclosure, a method for clock calibration is provided. The method is applicable to a driving chip, wherein the driving chip includes a plurality of clock calibration circuits, wherein each of the clock calibration circuits is configured with one clock frequency. The method includes
receiving display data from a controller based on an initial clock frequency;
receiving a configuration instruction from the controller, the configuration instruction including a reference clock frequency;
receiving a clock calibration signal of a target clock frequency from the controller, the target clock frequency being different from the initial clock frequency; and
adjusting a local clock frequency of the driving chip to the target clock frequency by a target clock calibration circuit, wherein a difference between a clock frequency configured for the target clock calibration circuit and the reference clock frequency is less than a difference between a clock frequency configured for other clock calibration circuits in the driving chip and the reference clock frequency.

In some embodiments, in response to adjusting the local clock frequency of the driving chip to the target clock frequency, the method further includes:
sending to the controller a feedback signal configured to indicate completion of clock calibration.

In a fourth aspect of the embodiments of the present disclosure, a method for clock calibration is provided. The method is applicable to a driving chip, and the method includes:
receiving display data from a controller based on an initial clock frequency;
receiving a clock calibration signal of a target clock frequency from the controller, the target clock frequency being different from the initial clock frequency; and
adjusting a local clock frequency of the driving chip from the initial clock frequency to the target clock frequency in the case that a duration for receiving the clock calibration signal reaches a target duration, and a fluctuation amplitude of a clock frequency of the clock calibration signal relative to the target clock frequency is less than an amplitude threshold within the target duration.

In a fifth aspect of the embodiments of the present disclosure, a controller is provided. The controller is configured to perform the method for clock calibration according to the first aspect. The controller includes:
a first sending module, configured to send display data to a target driving chip based on an initial clock frequency, the target driving chip including a plurality of clock calibration circuits, each of the clock calibration circuits being configured with one clock frequency;
a second sending module, configured to send a configuration instruction to the target driving chip, the configuration instruction including a reference clock frequency; and
a third sending module, configured to send a clock calibration signal of a first target clock frequency to the target driving chip, the first target clock frequency being different from the initial clock frequency, wherein
the configuration instruction is configured to instruct the target driving chip to adjust a local clock frequency of the target driving chip to the first target clock frequency by a target clock calibration circuit, and a difference between a clock frequency configured for the target clock calibration circuit and the reference clock frequency is less than a difference between a clock frequency configured for other clock calibration circuits in the target driving chip and the reference clock frequency.

In a sixth aspect of the embodiments of the present disclosure, another controller is provided. The controller is configured to perform the method for clock calibration according to the second aspect. The controller includes:
a first sending module, configured to send display data to a target driving chip based on an initial clock frequency;
a second sending module, configured to send a clock calibration signal of a second target clock frequency to the target driving chip; and
a third sending module, configured to send the clock calibration signal of a first target clock frequency to the target driving chip in the case that a feedback signal configured to indicate completion of calibration of the second target clock frequency is received from the target driving chip;
wherein the initial clock frequency, the second target clock frequency, and the first target clock frequency are sequentially increased or decreased.

In a seventh aspect of the embodiments of the present disclosure, a driving chip is provided. The driving chip includes a receiving circuit, and a plurality of clock calibration circuits, wherein each of the clock calibration circuits is configured with one clock frequency. The receiving circuit is configured to:
receive display data from a controller based on an initial clock frequency;
receive a configuration instruction from the controller, the configuration instruction including a reference clock frequency; and receive a clock calibration signal of a target clock frequency from the controller, the target clock frequency being different from the initial clock frequency, wherein a target clock calibration circuit in the plurality of clock calibration circuits is configured to adjust a local clock frequency of the driving chip to the target clock frequency, wherein a difference between a clock frequency configured for the target clock calibration circuit and the reference clock frequency is less than a difference between a clock frequency configured for other clock calibration circuits in the driving chip and the reference clock frequency.

In an eighth aspect of the embodiments of the present disclosure, another driving chip is provided. The driving chip includes:

a receiving circuit, configured to receive display data from a controller based on an initial clock frequency; and further configured to receive a clock calibration signal of a target clock frequency from the controller, the target clock frequency being different from the initial clock frequency; and a clock calibration circuit, configured to adjust a local clock frequency of the driving chip from the initial clock frequency to the target clock frequency in the case that a duration for receiving the clock calibration signal reaches a target duration, and a fluctuation amplitude of a clock frequency of the clock calibration signal relative to the target clock frequency is less than an amplitude threshold within the target duration.

In a ninth aspect of the embodiments of the present disclosure, an electronic device for clock calibration is provided. The electronic device includes:

a processor; and a memory, configured to store one or more instructions executable by the processor;

wherein the processor, when loading and executing the one or more instructions, is caused to perform the method for clock calibration according to the first aspect or the second aspect; or the processor, when loading and executing the one or more instructions, is caused to perform the method for clock calibration according to the third aspect or the fourth aspect.

In a tenth aspect of the embodiments of the present disclosure, a display device is provided. The display device includes a display panel, a plurality of driving chips connected to the display panel, and a controller connected to the plurality of driving chips according to the fifth aspect or the sixth aspect, wherein at least one of the plurality of driving chips is the driving chip according to the seventh aspect or the eighth aspect.

In an eleventh aspect of the embodiments of the present disclosure, a non-transitory computer-readable storage medium is provided. The storage medium is configured to store one or more instructions therein. The one or more instructions, when loaded and executed by a processor of an electronic device, cause the electronic device to perform the method for clock calibration according to the first aspect or the second aspect; or cause the electronic device to perform the method for clock calibration according to the third aspect or the fourth aspect.

BRIEF DESCRIPTION OF THE DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may further derive other drawings from these accompanying drawings without creative efforts.

DETAILED DESCRIPTION

In order to make the objectives, technical solutions and advantages of the present disclosure clearer, a further detailed description will be made to the embodiments of the present disclosure below with reference to the accompanying drawings. Apparently, the described embodiments are merely some embodiments, rather than all embodiments, of the present disclosure. Based on the embodiments of the present disclosure, all other embodiments derived by a person of ordinary skill in the art without creative efforts shall be within the protection scope of the present disclosure.

In the related art, in an initialization phase of a display device, a TCON may perform clock calibration with a driving chip. Next, the TCON may transmit display data to the driving chip based on a calibrated initial clock frequency. However, in some application scenarios, the TCON needs to adjust a rate of transmitting the display data to the driving chip during the displaying process. Prior to adjusting the rate, the TCON needs to re-calibrate the clock with the driving chip during a blanking phase. When re-calibrating the clock, the TCON may send a clock signal of a target clock frequency to the driving chip. Since the target clock frequency is different from the initial clock frequency, the driving chip determines that the clock is loss-of-lock and feeds back a loss-of-lock signal to the TCON in response to receiving the clock signal of the target clock frequency. The TCON needs to send the clock signal of the target clock frequency to the driving chip again, such that the driving chip may re-calibrate the clock based on the clock signal. The above process of re-calibrating the clock requires a long time.

Figure 1:
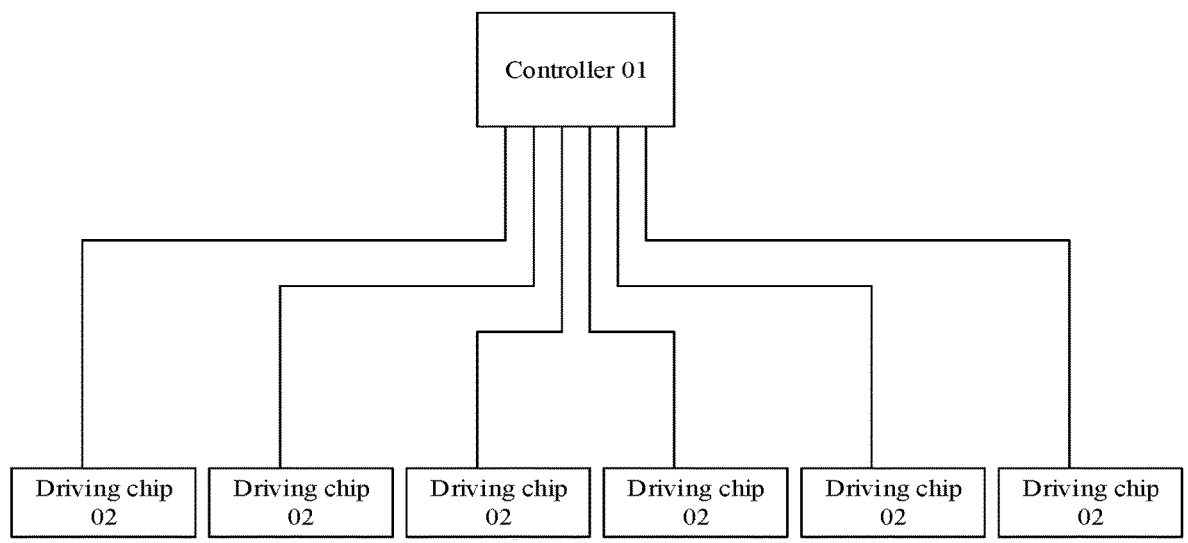
FIG. 1 is a schematic diagram of an application environment of a method for clock calibration according to an embodiment of the present disclosure.

FIG. 1 is a schematic diagram of an application environment of a method for clock calibration according to an embodiment of the present disclosure. As shown in FIG. 1, the method for clock calibration may be applicable to a display device. The display device includes a controller 01 and a plurality of driving chips 02, and each of the driving chips 02 establishes a communication connection with the controller 01. For example, a communication connection is established between the controller 01 and each of the driving chips 02, and data is exchanged between the controller 01 and each of the driving chips 02 using a Clock-Embedded High-Speed Point-to-Point Interface (CHPI) protocol. The controller 01 may be a TCON, a system on chip (SOC) or a micro controller unit (MCU). Each of the driving chips 02 may be a source driving chip. The driving chip 02 may also be referred to as a driver integrated circuit (driver IC).

Figure 2:
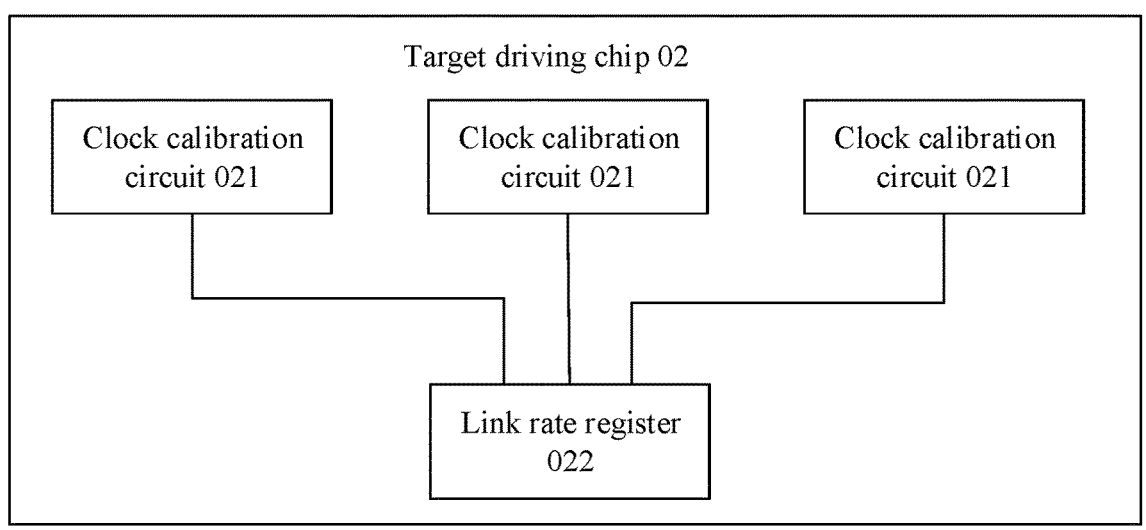
FIG. 2 is a schematic structural diagram of a driving chip according to an embodiment of the present disclosure.

FIG. 2 is a schematic structural diagram of a driving chip according to an embodiment of the present disclosure. As shown in FIG. 2, each of the driving chips 02 may include a plurality of clock calibration circuits 021. Each of the clock calibration circuits 021 is configured with one clock frequency, and each of the clock calibration circuits 021 operates with its configured clock frequency as a reference frequency.

In this embodiment of the present disclosure, in the initialization phase of the display device, the controller 01 may perform clock calibration with each of the driving chips 02, and transmit the display data to each of the driving chips 02 based on the calibrated clock frequency. During the displaying process, in response to determining that a rate of transmitting the display data to any driving chip 02 needs to be adjusted, the controller 01 may re-calibrate the clock with the driving chip 02 during the blanking phase. The blanking phase refers to a vertical blanking (V-blanking) phase. The vertical blanking phase refers to a period of time between finishing displaying one frame of image and starting to display the next frame of image, that is, a phase between the display of two frames of image.

As a refresh rate of the display device increases, the duration of the blanking phase becomes shorter. In the case that the clock calibration cannot be completed during the blanking phase, the normal display of the next frame of image will be affected. Therefore, a higher requirement is put forward on the efficiency of clock calibration.

Figure 3:
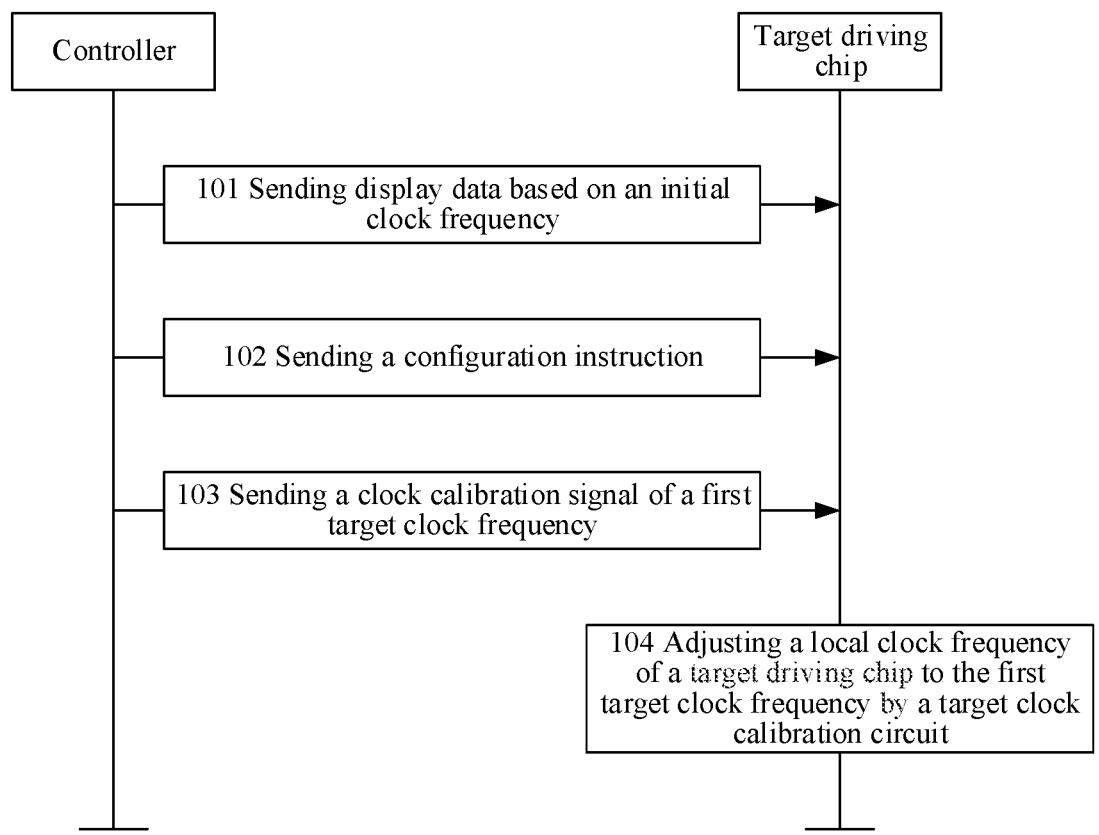
FIG. 3 is a flowchart of a method for clock calibration according to an embodiment of the present disclosure.

FIG. 3 is a flowchart of a method for clock calibration according to an embodiment of the present disclosure. The method may be applicable to the application scenario shown in FIG. 1. As shown in FIG. 3, the method includes the following steps.

In step 101, the controller sends display data to a target driving chip based on an initial clock frequency.

The initial clock frequency is a clock frequency calibrated by the controller and the target driving chip. The controller may send the display data to the target driving chip based on the initial clock frequency in the displaying phase. The display data may include a plurality of rows of pixel data corresponding to a plurality of rows of pixels one by one. The controller may send the plurality of rows of pixel data row by row, and the target driving chip may drive the display panel to display the image based on the received pixel data.

In step 102, the controller sends a configuration instruction to the target driving chip.

The configuration instruction includes a reference clock frequency. In this embodiment of the present disclosure, in response to determining that the rate of sending the display data to the target driving chip needs to be adjusted, the controller may send the configuration instruction carrying the reference clock frequency to the target driving chip.

In step 103, the controller sends a clock calibration signal of a first target clock frequency to the target driving chip.

In response to determining that the rate at which the display data is sent to the target driving chip needs to be adjusted to a target rate, the controller may further determine the first target clock frequency corresponding to the target rate. In addition, the controller may send the clock calibration signal of the first target clock frequency to the target driving chip in a blanking phase upon the displaying phase. The rate at which the controller sends the display data is positively related to the clock frequency. That is, the higher the clock frequency is, the higher the rate at which the controller sends the display data is. The first target clock frequency is different from the initial clock frequency, and the reference clock frequency is equal to or close to the first target clock frequency.

In some embodiments, the controller may directly set the reference clock frequency as a frequency that is equal to the first target clock frequency. Alternatively, the controller may select a clock frequency closest to the first target clock frequency as the reference clock frequency from dock frequencies configured for the respective clock calibration circuits based on the clock frequencies configured for the respective clock calibration circuits in the target driving chip.

In step 104, the target driving chip adjusts its local clock frequency to the first target clock frequency by a target clock calibration circuit.

The target driving chip includes a plurality of clock calibration circuits, wherein each of the clock calibration circuits is configured with one clock frequency. In the case that the target driving chip receives the configuration instruction carrying the reference clock frequency, the target clock calibration circuit may be determined from the plurality of clock calibration circuits. A difference between a clock frequency configured for the target clock calibration circuit and the reference clock frequency is less than a difference between a clock frequency configured for other clock calibration circuits in the target driving chip and the reference dock frequency. That is, the target clock calibration circuit is a clock calibration circuit configured with the clock frequency having a smallest difference from the reference clock frequency among the plurality of clock calibration circuits. Furthermore, when the target driving chip receives a clock calibration signal of the first target clock frequency that is different from the initial clock frequency, the target clock calibration circuit may adjust its local clock frequency from the initial clock frequency to the first target clock frequency, thereby realizing clock calibration.

In summary, this embodiment of the present disclosure provides a method for clock calibration. The target driving chip includes the plurality of clock calibration circuits, wherein each of the clock calibration circuits is configured with one clock frequency. Therefore, prior to sending the clock calibration signal, the controller may send the reference clock frequency to the driving chip over the configuration instruction, such that the driving chip may determine the target clock calibration circuit for clock calibration based on the configuration instruction. In this embodiment of the present disclosure, the reference clock frequency may be set as a clock frequency equal to or close to the first target clock frequency to ensure that the target clock calibration circuit can start clock calibration from a clock frequency equal to or close to the first target clock frequency. Therefore, the clock calibration may be completed rapidly to improve the efficiency of clock calibration, and meet the requirements of the display device with a high refresh rate.

Figure 4:
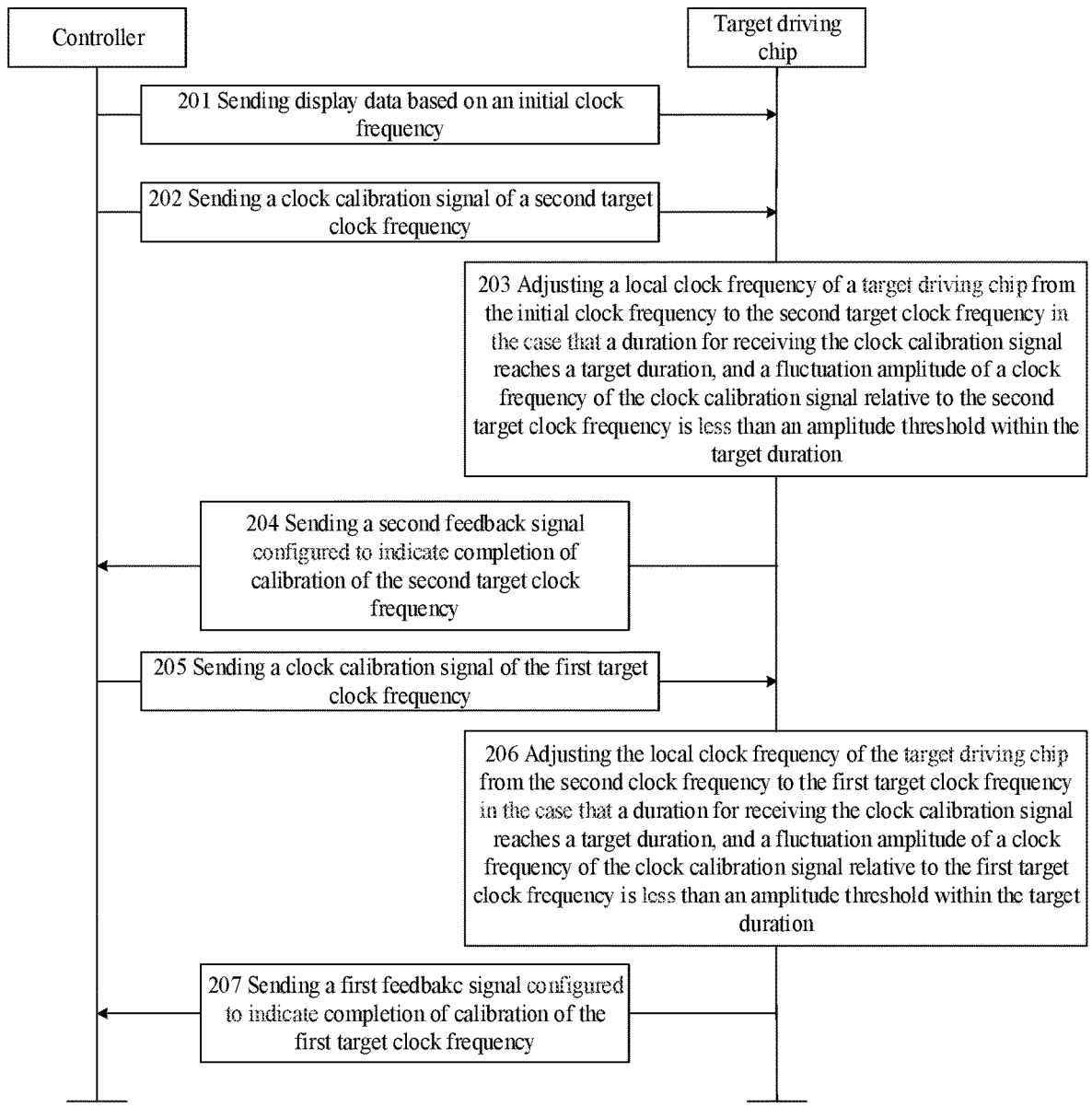
FIG. 4 is a flowchart of another method for clock calibration according to an embodiment of the present disclosure.

FIG. 4 is a flowchart of another method for clock calibration according to an embodiment of the present disclosure. This method may be applicable to the application scenario as shown in FIG. 1. As shown in FIG. 4, the method includes the following steps.

In step 201, a controller sends display data to a target driving chip based on an initial clock frequency.

The initial clock frequency is a clock frequency calibrated by the controller and the target driving chip. The controller may send the display data to the target driving chip based on the initial clock frequency in the displaying phase. The display data may include a plurality of rows of pixel data corresponding to a plurality of rows of pixels one by one, and the target driving chip may drive the display panel to display the image based on the display data.

In step 202, the controller sends a clock calibration signal of a second target clock frequency to the target driving chip.

In response to determining that the rate at which the display data is sent to the target driving chip needs to be adjusted to a target rate, the controller may further determine a first target clock frequency corresponding to the target rate. Furthermore, in order to ensure that the local clock frequency of the target driving chip can be smoothly adjusted to the first target clock frequency, the controller may also determine a second target clock frequency between the initial clock frequency and the first target clock frequency. That is, the initial clock frequency, the second target clock frequency, and the first target clock frequency may be sequentially increased or decreased. Further, the controller may send a clock calibration signal of the second target clock frequency to the target driving chip in a blanking phase upon the displaying phase.

In step 203, in the case that a duration during which the target driving chip receives the clock calibration signal reaches a target duration, and a fluctuation amplitude of a clock frequency of the clock calibration signal relative to the second target clock frequency is less than an amplitude threshold within the target duration, the target driving chip adjusts its local clock frequency from the initial clock frequency to the second target clock frequency.

In response to receiving a clock calibration signal of the second target clock frequency that is different from the initial clock frequency, the target driving chip may detect whether the clock calibration signal is a stable clock signal. The clock calibration signal may be determined as a stable clock signal in the case that a duration during which the target driving chip receives the clock calibration signal reaches a target duration, and a fluctuation amplitude of a clock frequency of the clock calibration signal relative to the second target clock frequency is less than an amplitude threshold within the target duration. Further, the target driving chip may adjust its local clock frequency to the second target clock frequency from the initial clock frequency by the clock calibration circuit thereof.

The amplitude threshold may be a fixed value pre-configured in the target driving chip.

In step 204, the target driving chip sends to the controller a second feedback signal configured to indicate completion of calibration of the second target clock frequency.

In response to successfully adjusting its local clock frequency to the second target clock frequency, the target driving chip may send to the controller a second feedback signal configured to indicate completion of calibration of the second target clock frequency.

In step 205, the controller sends a clock calibration signal of the first target clock frequency to the target driving chip.

In response to receiving from the target driving chip the second feedback signal configured to indicate completion of calibration of the second target clock frequency, the controller may determine that the target driving chip has completed the calibration of the second target clock frequency. Further, the controller may continue to send the clock calibration signal of the first target clock frequency to the target driving chip during the blanking phase.

In some embodiments, a difference between the first target clock frequency and the second target clock frequency may be equal to a difference between the second target clock frequency and the initial clock frequency, or may not be equal to the difference between the second target clock frequency and the initial clock frequency. When the two differences are equal, it can be ensured that the target driving chip adjusts its local clock frequency based on a fixed frequency interval, and the local clock frequency of the target driving chip can smoothly transition to the first target clock frequency.

In some embodiments, it is assumed that a rate at which the controller sends the display data to the target driving chip is 10 times of the clock frequency. In response to determining that a target rate at which the display data is sent to the target driving chip needs to reach 2.4 gigabits per second (Gbps), the controller may determine that the first target clock frequency corresponding to the target rate is 0.24 gigahertz (GHz). In the case that the initial clock frequency is 0.3 GHz, the controller may determine that the second target clock frequency is 0.25 GHz, or may determine that the second target clock frequency is 0.27 GHz.

In step 206, in the case that a duration during which the target driving chip receives the clock calibration signal reaches a target duration, and a fluctuation amplitude of a clock frequency of the clock calibration signal relative to the first target clock frequency is less than an amplitude threshold within the target duration, the target driving chip adjusts its local clock frequency to the first target clock frequency from the second clock frequency.

In response to receiving the clock calibration signal of the first target clock frequency that is different from the second clock frequency, the target driving chip may detect whether the clock calibration signal is a stable clock signal. The clock calibration signal can be determined as a stable clock signal in the case that a duration during which the target driving chip receives the clock calibration signal reaches a target duration, and a fluctuation amplitude of a clock frequency of the clock calibration signal relative to the first target clock frequency is less than an amplitude threshold within the target duration. Further, the target driving chip may adjust its local clock frequency to the first target clock frequency from the second clock frequency by the clock calibration circuit thereof.

In step 207, the target driving chip sends to the controller a first feedback signal configured to indicate completion of calibration of the first target clock frequency.

In response to successfully adjusting its local clock frequency to the first target clock frequency, the target driving chip may send to the controller a first feedback signal configured to indicate completion of calibration of the first target clock frequency.

In some embodiments, in addition to determining one second target clock frequency between the initial clock frequency and the first target clock frequency, the controller may also determine at least one third target clock frequency between the second target clock frequency and the first target clock frequency. That is, the initial clock frequency, the second target clock frequency, the at least one third target clock frequency and the first target dock frequency may be sequentially increased or decreased.

Correspondingly, in response to receiving the second feedback signal, the controller may send a clock calibration signal of the third target clock frequency to the target driving chip, so as to adjust the local clock frequency of the target driving chip from the second target clock frequency to the third target clock frequency. In response to receiving a third feedback signal configured to indicate completion of calibration of the third target clock frequency, the controller then performs step 205. For details of the process of sending the clock calibration signal of the third target frequency by the controller, reference may be made to step 202; and for details of the process of adjusting the local clock frequency by the target driving chip to the third target clock frequency, reference may be made to step 203, which are not repeated herein.

It should be understood that, steps 202 to 204 may be canceled according to situations. That is, in response to determining that the rate at which the display data is sent to the target driving chip needs to be adjusted, the controller may directly send the clock calibration signal of the first target clock frequency to the target driving chip, such that the target driving chip directly adjusts its local clock frequency from the initial clock frequency to the first target clock frequency. That is, there is no need to send the clock calibration signal of the second target clock frequency to the target driving chip, i.e., it is not necessary to enable the target driving chip to adjust its local clock frequency from the initial clock frequency to the second target clock frequency firstly.

In summary, this embodiment of the present disclosure provides a method for clock calibration. During clock calibration, the controller may transmit clock calibration signals of different target frequencies for a plurality of times, and the clock frequencies of the clock calibration signals transmitted for the plurality of times may be sequentially increased or decreased. Therefore, it can be ensured that each time the driving chip performs clock calibration, a change amplitude of the clock frequency is relatively small, and a success rate of clock calibration is increased.

In addition, in this embodiment of the present disclosure, in response to receiving the clock calibration signal of the target clock frequency that is different from the initial clock frequency that has been calibrated, the target driving chip may perform clock calibration directly on its local clock frequency based on the clock calibration signal in response to detecting that the clock calibration signal is a stable clock signal. Compared with a technical solution in the related art in which a clock is directly determined to be loss-of-lock and a loss-of-lock signal is fed back to the controller, the method provided in this embodiment of the present disclosure can effectively improve the efficiency of clock calibration.

Figure 5:
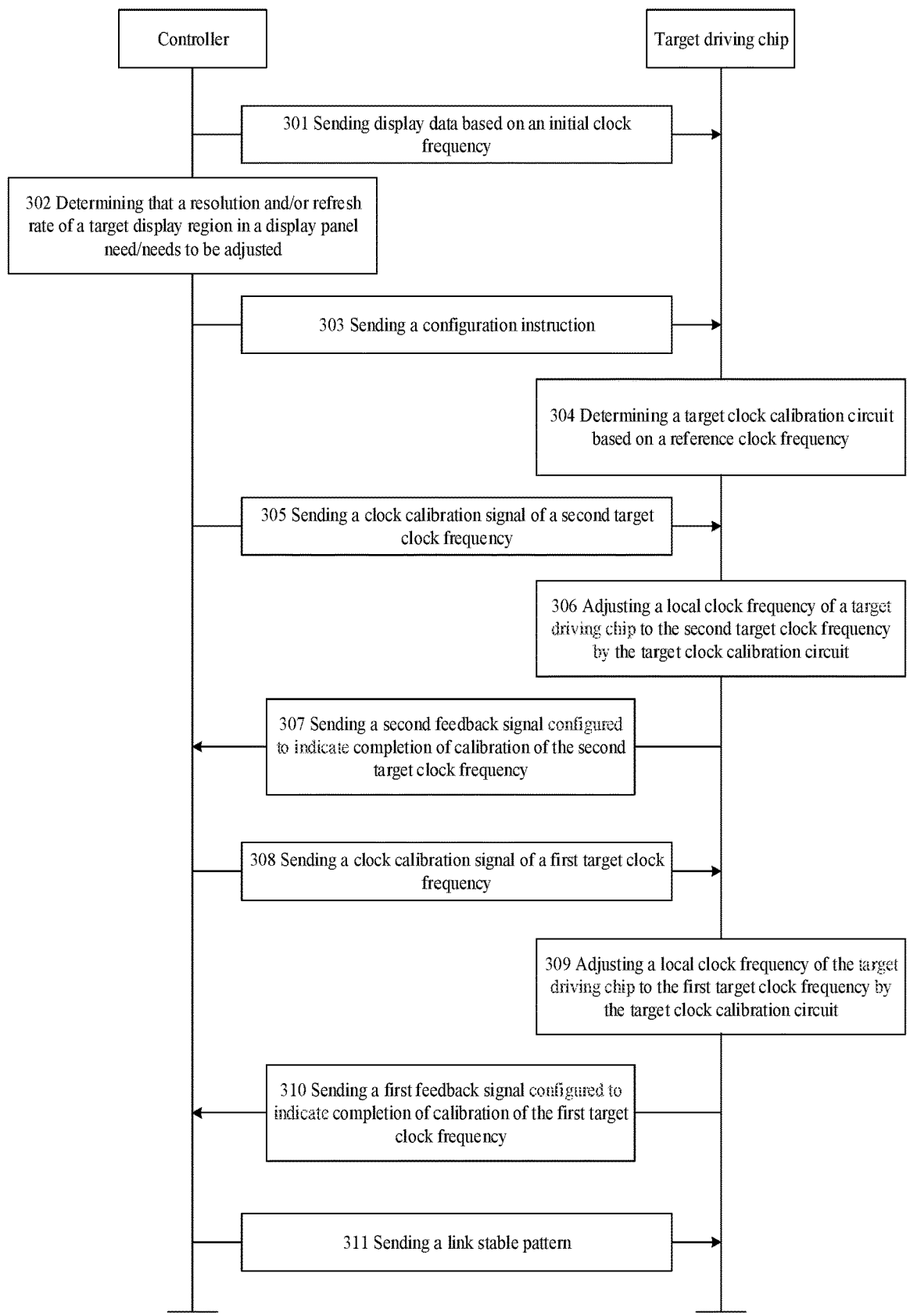
FIG. 5 is a flowchart of yet another method for clock calibration according to an embodiment of the present disclosure.

FIG. 5 is a flowchart of yet another method for clock calibration according to an embodiment of the present disclosure. This method may be applicable to the application scenario shown in FIG. 1. As shown in FIG. 5, the method includes the following steps.

In step 301, a controller sends display data to a target driving chip based on an initial clock frequency.

The initial clock frequency is a clock frequency calibrated by the controller and the target driving chip For example, the initial clock frequency may be a clock frequency in response to clock calibration performed in an initialization phase of a display device, or may be a clock frequency in response to clock calibration performed in a blanking phase before the current displaying phase. The controller may send the display data to the target driving chip based on the initial clock frequency in the displaying phase. The display data may include a plurality of rows of pixel data corresponding to a plurality of rows of pixels one by one, and the controller may send the plurality of rows of pixel data to the target driving chip row by row. The target driving chip may then drive a display region corresponding thereto in a display panel to display the image based on the received display data.

Figure 6:
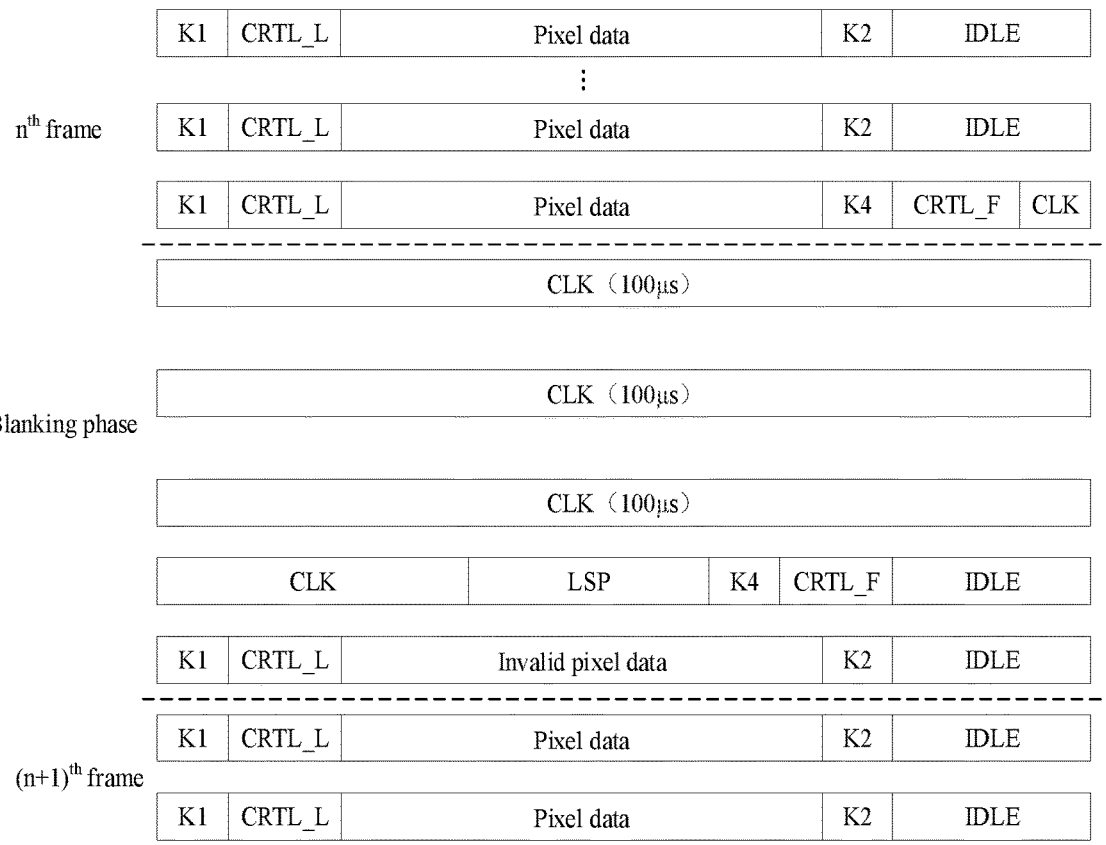
FIG. 6 is a schematic diagram of data sent by a controller according to an embodiment of the present disclosure.

In some embodiments, referring to FIG. 6, each row of data sent by the controller to the target driving chip each time may include a start indicator K1, a configuration instruction CTRL_L, pixel data, and an end indicator that are arranged in sequence. For the first row of data to the penultimate row of data, the end indicator may be K2; and for the last row of data, the end indicator may be K4. The configuration instruction CTRL_L is a traditional configuration instruction, and is located at the beginning of a row of data. The configuration instruction CTRL_L may be configured to indicate the beginning of each row of data. In addition, as can be seen from FIG. 6, the data in the first row to the data in the penultimate row may further include an idle region.

In some embodiments, as shown in FIG. 6, it is assumed that the current displaying phase is a phase for displaying an $n^{th}$ (n is a positive integer) frame of image, the controller may send a plurality of rows of pixel data in the display data of the $n^{th}$ frame of image to the target driving chip row by row. The time required for the controller to send one row of data to the target driving chip each time is a fixed duration, for example, may be 7.4 μs.

It should be understood that, as can be seen from FIG. 1, the controller 01 may be connected to a plurality of driving chips 02, and each of the driving chips 02 is connected to at least one column of pixels in the display panel. Each of the driving chips 02 is configured to drive at least one column of pixels connected thereto to emit light. That is, each of the driving chips 02 is configured to drive a display region in the display panel to display the image. The target driving chip may be any driving chip of the plurality of driving chips 02. In addition, the pixel data in one row of data sent by the controller 01 to the target driving chip 02 each time may only include pixel data of pixels connected to the target driving chip 02. For example, it is assumed that the target driving chip 02 is connected to m (m is an integer greater than 1) column of pixels, then one row of data sent by the controller 01 to the target driving chip 02 each time may include pixel data of m pixels in a row.

In step 302, the controller determines that a resolution and/or a refresh rate of a target display region in the display panel need/needs to be adjusted.

During the displaying process, the controller may detect whether the resolution and/or refresh rate of each display region in the display panel need/needs to be adjusted. In response to determining that the resolution and/or refresh rate of the target display region need/needs to be adjusted, the controller may determine that the rate at which the display data is sent to the target driving chip configured to drive the target display region needs to be adjusted. Furthermore, the controller may determine that there is a need to perform clock calibration again with a target driving chip configured to drive the target display region.

In some embodiments, the display device may include a camera. The display device may determine a size of a viewer's face based on image data collected by the camera, and then may determine a relative position between the viewer and the display panel, and the relative position may include a distance. Next, the display device may calculate a region on the display panel that needs to display a high-definition image. In the case that the relative position between the viewer and the display panel changes, the region on the display panel that needs to display the high-definition image changes accordingly. Correspondingly, the controller may determine a target display region whose resolution needs to be adjusted. For example, when the distance between the viewer and the display panel becomes farther, in the case of the same optimal viewing angle of 30°, the area that the viewer's line of sight is projected onto the display panel becomes larger. The number of regions on the display panel that need to display the high-definition image increases accordingly, and the controller may determine the newly added regions that need to display the high-definition image as the target display region where the resolution need to be adjusted.

Figure 7:
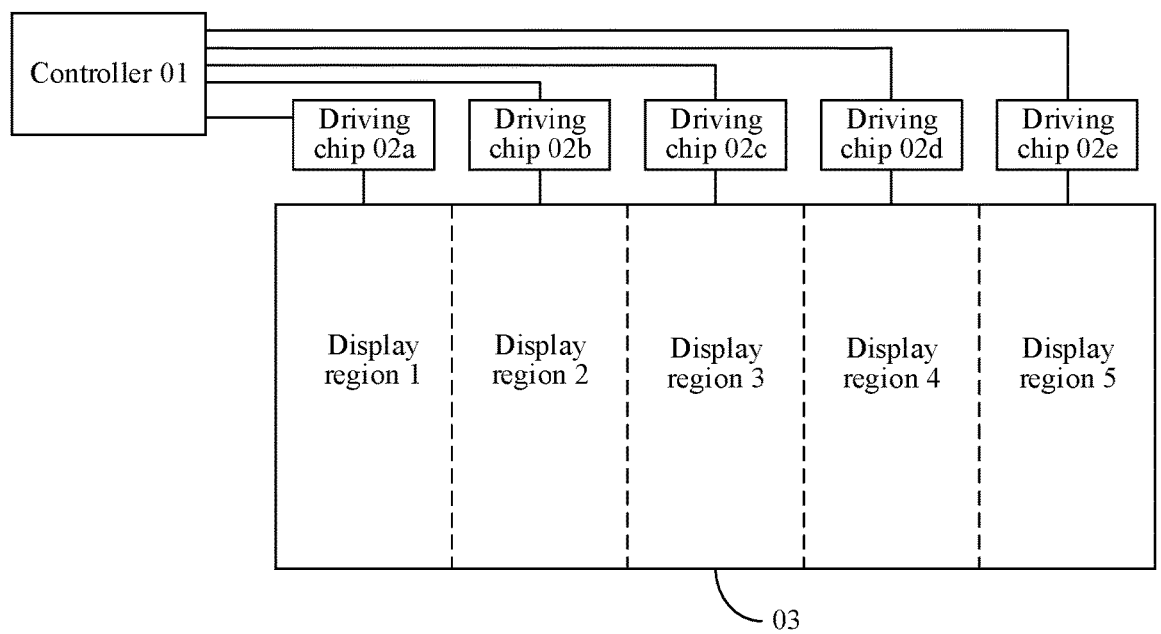
FIG. 7 is a schematic structural diagram of a display device according to an embodiment of the present disclosure.

In some embodiments, as shown in FIG. 7, it is assumed that the display device includes five driving chips 02a to 02e, wherein each of the driving chips drives one display region of the display panel 03 respectively. It is assumed that the controller 01 determines that the regions on the display panel that need high-definition display is a display region 3 based on the relative position between the viewer and the display panel, and the controller 01 may transmit display data to the driving chip 02c configured to drive the display region 3 at a higher clock frequency. In the case that the relative positional relationship between the viewer and the display panel changes, in response to determining that display regions that need high-definition display are a display region 2 and the display region 3, the controller 01 may determine that the target display region that needs to be adjusted for resolution is the display region 2.

It should be understood that, in addition to the way of determining the target display region whose resolution needs to be adjusted based on the relative position between the viewer and the display panel, the controller may also determine the target display region in other ways. For example, in a naked-eye three-dimensional (3D) display scenario, the controller may determine a gaze region of human eyes and a non-gaze region in the display panel, wherein there are more viewpoints in the gaze region of the human eye, and the gaze region of the human eye has a higher resolution; and there are fewer viewpoints in the non-gaze region, and the non-gaze region has a lower resolution. Correspondingly, in response to detecting that the gaze region of the human eyes in the display panel has changed, the controller may determine the target display region whose resolution needs to be adjusted based on the changed gaze area of the human eyes.

In step 303, the controller sends a configuration instruction to the target driving chip.

The target driving chip is a driving chip configured to drive the target display region. In this embodiment of the present disclosure, in response to determining that the resolution of the target display region needs to be adjusted, the controller may determine that the rate at which the display data is sent to the target driving chip configured to drive the target display region needs to be adjusted. Further, the controller may send the configuration instruction to the target driving chip in the displaying phase in response to completing sending the pixel data in the last row to the target driving chip. The configuration instruction includes a reference clock frequency. In some embodiments, the controller may determine that the rate at which the display data is sent to the target driving chip needs to be adjusted to a target rate, and further determine a first target clock frequency corresponding to the target rate.

In some embodiments, the controller may directly determine the reference clock frequency based on the first target clock frequency, and the reference clock frequency may be equal to or close to the first target clock frequency. For example, the controller may directly determine the reference clock frequency based on the first target clock frequency in the case of determining that a difference between the first target clock frequency and the initial clock frequency is less than a difference threshold. In this embodiment, the controller may instruct the target driving chip to directly adjust a local clock frequency of the target driving chip from the initial clock frequency to the first target clock frequency.

In some embodiments, the controller may also first determine a second target clock frequency between the initial clock frequency and the first target clock frequency. That is, the initial clock frequency, the second target clock frequency, and the first target clock frequency may be sequentially increased or decreased. Further, the controller may determine the reference clock frequency based on the second target clock frequency, and the reference clock frequency may be equal to or close to the second target clock frequency. For example, the controller may first determine the second target clock frequency in the case of determining that a difference between the first, target clock frequency and the initial clock frequency is greater than or equal to the difference threshold, and then determine the reference clock frequency based on the second target clock frequency.

In some embodiments, the controller may instruct the target driving chip to first adjust the local clock frequency of the target driving chip from the initial clock frequency to the second target clock frequency, and then adjust the second target clock frequency to the first target clock frequency. Based on this embodiment, it can be ensured that the target driving chip can adjust its local clock frequency smoothly, such that abnormalities caused by an excessive change amplitude of the clock frequency are avoided, and the success rate of clock calibration is increased.

It should be understood that, in this embodiment, the difference between the first target clock frequency and the second target clock frequency may be the same as or different from the difference between the second target clock frequency and the initial clock frequency, which is not limited in this embodiment of the present disclosure. When the two differences are equal, it can be ensured that the target driving chip adjusts its local clock frequency based on a fixed frequency interval, and the local clock frequency of the target driving chip can smoothly transition to the first target clock frequency.

Hereinafter, the way by which the controller determines the reference clock frequency based on the second target clock frequency is taken as an example for description. In some embodiments, the controller may directly set the reference clock frequency as a frequency that is equal to the second target clock frequency. Alternatively, the controller may select a clock frequency closest to the second target clock frequency as the reference clock frequency from clock frequencies configured for the respective clock calibration circuits based on the clock frequencies configured for the respective clock calibration circuits in the target driving chip.

In some embodiments, as shown in FIG. 6, the last row of data sent by the controller to the target (hiving chip further include a configuration instruction CRTL_F located behind pixel data. The configuration instruction CRTL_F may carry the reference clock frequency. Referring to FIG. 2, it is assumed that the target driving chip 02 includes three clock calibration circuits 021, and clock frequencies configured for the three clock calibration circuits 021 are 0.22 GHz, 0.26 GHz, and 0.3 GHz, respectively.

It is assumed that the rate at which the controller sends the display data to the target driving chip is equal to 10 times of its clock frequency, in the case that the target rate is 2.4 Gbps, a first target clock frequency corresponding to the target rate determined by the controller 01 is 0.24 GHz. In the case that the initial clock frequency is 0.3 GHz, the controller 01 may determine that a second target clock frequency between the initial clock frequency and the first target clock frequency is 0.25 GHz. Further, the controller may determine that the reference clock frequency is a clock frequency that is equal to the second target clock frequency. That is, the controller may determine that the reference clock frequency is 0.25 GHz. Alternatively, the controller may also determine a clock frequency closest to the second target clock frequency among the clock frequencies configured for the three clock calibration circuits as the reference clock frequency. That is, the controller determine that the reference clock frequency is 0.26 GHz.

In step 304, the target driving chip determines a target clock calibration circuit based on the reference clock frequency.

In response to receiving the configuration instruction from the controller, the target driving chip may acquire the reference clock frequency from the configuration instruction. Next, the target driving chip may determine a target clock calibration circuit configured with a clock frequency having a smallest difference from the reference clock frequency among the plurality of clock calibration circuits thereof.

In some embodiments, as shown in FIG. 2, the target driving chip 02 may further include a link speed register 022, and the link speed register 022 is connected to the plurality of clock calibration circuits 021. In response to acquiring the reference clock frequency and determining the target clock calibration circuit, the target driving chip 02 may gate the target clock calibration circuit by configuring a register value of the link rate register 022. That is, set the target clock calibration circuit to be in an operating state. Then, the target clock calibration circuit can perform clock calibration.

In step 305, the controller sends a clock calibration signal of a second target clock frequency to the target driving chip.

In this embodiment of the present disclosure, in response to sending the configuration instruction carrying the second target clock frequency to the target driving chip, the controller may send a clock calibration signal of the second target clock frequency to the target driving chip in a blanking phase upon the displaying phase.

In some embodiments, the controller may send the clock calibration signal of the second target clock frequency to the target driving chip within one first synchronization cycle. A duration of the first synchronization cycle is less than a duration of the blanking phase.

In some embodiments, it is assumed that the duration of the blanking phase is 666 μs, the duration of the first synchronization cycle is 100 μs, and the second target clock frequency is 025 GHz. Then, the controller may send a clock calibration signal with a clock frequency of 0.25 GHz to the target driving chip within the first synchronization cycle of 100 μs.

It should be understood that, in the case that the displaying phase has not ended in in response to sending the last row of pixel data and the configuration instruction to the target driving chip, the controller may start to send the clock calibration signal of the second target clock frequency. In some embodiments, as shown in FIG. 6, in the last row of data of an $n^{th}$ frame of image in a displaying phase, the controller may start sending the clock calibration signal of the second target clock frequency in response to sending the configuration instruction CRTL_F.

In step 306, the target driving chip adjusts its local clock frequency to the second target clock frequency by a target clock calibration circuit.

In response to receiving the clock calibration signal of the second target clock frequency from the controller, the target driving chip may adjust its local clock frequency from the initial clock frequency to the second target clock frequency by the target clock calibration circuit, thereby realizing clock calibration. Since the clock frequency configured for the target clock calibration circuit is equal to or close to the second target clock frequency, it may be ensured that the target clock calibration circuit can rapidly adjust the local clock frequency of the target driving chip to the second target clock frequency.

In some embodiments, the target driving chip may adjust its local clock frequency from 0.3 GHz to 0.25 GHz by a target clock calibration circuit configured with the clock frequency of 0.26 GHz.

In step 307, the target driving chip sends to the controller a second feedback signal configured to indicate completion of calibration of the second target clock frequency.

In response to successfully adjusting its local clock frequency to the second target clock frequency, the target driving chip may send to the controller the second feedback signal configured to indicate completion of calibration of the second target clock frequency.

It should be understood that, in the case that the target driving chip completes the calibration of its local clock frequency before the end of the first synchronization cycle, the controller may receive the second feedback signal from the target driving chip before the end of the first synchronization cycle. Correspondingly, in response to receiving the second feedback signal, the controller may stop sending the clock calibration signal of the second target clock frequency.

In step 308, the controller sends the dock calibration signal of the first target clock frequency to the target driving chip.

In response to receiving the second feedback signal from the target driving chip, the controller may determine that the target driving chip has completed the calibration of the second target clock frequency. Therefore, the controller determines that the calibration of the first target clock frequency may be started. That is, the controller may send the clock calibration signal of the first target clock frequency to the target driving chip.

In some embodiments, the controller may send the clock calibration signal of the first target clock frequency to the target driving chip within one first synchronization cycle.

In some embodiments, it is assumed that the duration of the first synchronization cycle is 100 μs and the first target clock frequency is 0.24 GHz, then the controller may send a clock calibration signal with a clock frequency of 0.24 GHz to the target driving chip within the first synchronization cycle of 100 μs.

It should be understood that, the first synchronization cycle in which the clock calibration signal of the first target clock frequency is sent and the first synchronization cycle in which the clock calibration signal of the second target clock frequency is sent may be the same or different. In addition, there is a time interval between the first synchronization cycle in which the clock calibration signal of the first target clock frequency is sent and the first synchronization cycle in which the clock calibration signal of the second target clock frequency is sent, and the target driving chip may send the second feedback signal within the time interval.

In step 309, the target driving chip adjusts its local clock frequency to the first target clock frequency by a target clock calibration circuit.

In response to receiving a clock calibration signal of the first target clock frequency from the controller, the target driving chip may adjust its local clock frequency from the second clock frequency to the first target clock frequency by the target clock calibration circuit, thereby realizing clock calibration.

In some embodiments, the target driving chip may adjust its local clock frequency from 0.25 GHz to 0.24 GHz.

In step 310, the target driving chip sends to the controller a first feedback signal configured to indicate completion of calibration of the first target clock frequency.

In response to successfully adjusting its local clock frequency to the first target clock frequency, the target driving chip may send to the controller the first feedback signal configured to indicate completion of calibration of the first target clock frequency.

It should be understood that, in the case that the target driving chip completes the calibration of its local clock frequency before the end of the first synchronization cycle, the controller may receive the first feedback signal from the target driving chip before the end of the first synchronization cycle. Correspondingly, in response to receiving the first feedback signal, the controller may stop sending the clock calibration signal of the first target clock frequency.

In step 311, the controller sends a link stable pattern to the target driving chip.

In response to receiving from the target driving chip the first feedback signal configured to indicate completion of calibration of the first target clock frequency, the controller may determine that the clock calibration with the target driving chip has been completed. Further, the controller may send the link stable pattern to the target driving chip to implement scrambled resetting.

In this embodiment of the present disclosure, during the transmission process of the display data, the controller performs a scrambling operation on the display data, and the driving chip performs a descrambling operation, wherein the descrambling operation is associated with the scrambling operation. However, when a data transmission rate changes, an operating state of scrambling of the controller and an operating state of descrambling of the driving chip in response to relocking the clock may not be synchronized, which affects the normal reception of data. The controller and the driving chip need to be reset again, and the resetting needs to refer to the LSP. Therefore, in the case that the clock calibration is completed, in accordance with a CHPI protocol, the controller needs to send the LSP to the target driving chip. Therefore, when the controller sends the display data at a new rate, the driving chip may implement a reset operation by referring to the LSP sent by the controller, without affecting the transmission of the display data.

In some embodiments, referring to FIG. 6, in response to receiving the first feedback signal, the controller may stop sending the clock calibration signal of the first target clock frequency, and send the LSP to the target driving chip. In addition, the controller may also send an end indicator K4 and a configuration instruction CRTL_F in response to sending the LSP. In this embodiment of the present disclosure, the configuration instruction CTRL_F sent by the controller in response to sending the LSP does not carry the reference clock frequency. The configuration instruction CTRL_F may be configured to transmit static or dynamic parameter setting data for the driving chip.

In some embodiments, as shown in FIG. 6, in response to sending the LSP and before the blanking phase ends, the controller may also send invalid pixel data to the target driving chip until the blanking phase ends.

In some embodiments, in this embodiment of the present disclosure, in addition to determining one second target clock frequency between the initial clock frequency and the first target clock frequency, the controller may also determine at least one third target clock frequency between the second target clock frequency and the first target clock frequency. That is, the initial clock frequency, the second target clock frequency, the at least one third target clock frequency and the first target clock frequency may be sequentially increased or decreased.

Further, in response to receiving the second feedback signal, the controller may first send a clock calibration signal of the third target clock frequency to the target driving chip, so as to adjust the local clock frequency of the target driving chip from the second target clock frequency to the third target clock frequency. In response to receiving a third feedback signal configured to indicate completion of calibration of the third target clock frequency, the controller performs step 308. For details of the process of sending the clock calibration signal of the third target frequency by the controller, reference may be made to step 305; and for details of the process of adjusting the local clock frequency by the target driving chip to the third target clock frequency, reference may be made to step 306, which are not repeated herein.

In some embodiments, it is assumed that the initial clock frequency is 0.3 GHz, and the first target clock frequency is 0.24 GHz. Then, the controller may determine that the second target clock frequency is 0.25 GHz between the initial clock frequency and the first target clock frequency, and determine that the third target clock frequency is 0.245 GHz. Correspondingly, the target driving chip may first adjust the local clock frequency from 0.3 GHz to 0.25 GHz based on the clock calibration signal of the second target clock frequency. Next, the local clock frequency is adjusted from 0.25 GHz to 0.245 GHz based on the clock calibration signal of the third target clock frequency. At last, the local clock frequency is adjusted from 0.245 GHz to 0.24 GHz based on the clock calibration signal of the first target clock frequency.

In this embodiment of the present disclosure, before the blanking phase ends, in the case that the target driving chip has successfully adjusted the local clock frequency to the first clock frequency corresponding to the target rate, the controller may send the display data to the target driving chip at the target rate in the next displaying phase.

In some embodiments, as shown in FIG. 6, the controller may send a plurality of rows of pixel data of an $(n+1)^{th}$ frame of image row by row to the target driving chip at a rate of 2.4 Gbps during the displaying phase of the $(n+1)^{th}$ frame of image.

Figure 8:
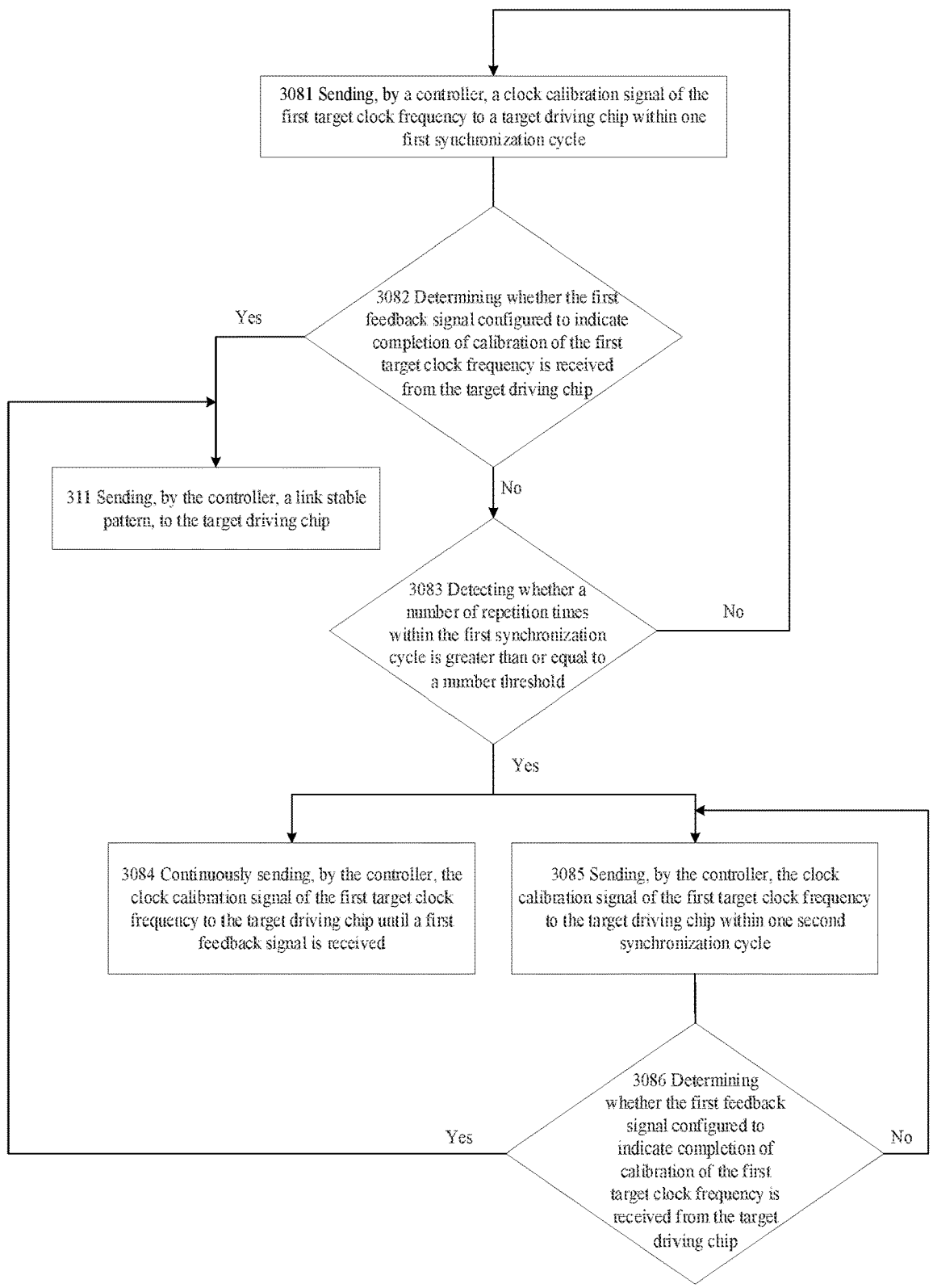
FIG. 8 is a flowchart of a method for sending a clock calibration signal according to an embodiment of the present disclosure.

In some embodiments, as shown in FIG. 8, step 308 includes the following steps.

In step 3081, the controller sends the clock calibration signal of the first target clock frequency to the target driving chip within one first synchronization cycle.

The first synchronization cycle is a fixed cycle preconfigured in the controller, and a duration of the first synchronization cycle is less than a duration of the blanking phase.

In some embodiments, it is assumed that the duration of the first synchronization cycle is 100 μs and the first target clock frequency is 0.24 GHz, the controller may send a clock calibration signal with a clock frequency of 0.24 GHz to the target driving chip within the first synchronization cycle having a duration of 100 μs.

In step 3082, the controller determines whether the first feedback signal configured to indicate completion of calibration of the first target clock frequency is received from the target driving chip.

The target driving chip calibrates its local clock frequency in response to receiving the clock calibration signal of the first target clock frequency. In the case that the clock calibration is successfully completed, the first feedback signal configured to indicate completion of calibration of the first target clock frequency is sent to the controller. In the case that the clock calibration is not completed, the first feedback signal is not sent. Correspondingly, in the case of receiving the first feedback signal, the controller may continue to perform step 311. In the case of not receiving the first feedback signal, the controller may perform step 3083.

In step 3083, the controller determines whether a number of repetition times within the first synchronization cycle is greater than or equal to a number threshold.

In the case that the first synchronization cycle ends, in response to not receiving the first feedback signal from the target driving chip, the controller may detect whether the number of repetition times within the first synchronization cycle is greater than or equal to the number threshold. The number threshold is a fixed value pre-configured in the controller, and the number threshold may be determined based on the duration of the first synchronization cycle and the duration of the blanking phase. For example, a product of the number threshold and the duration of the first synchronization cycle may be less than the duration of the blanking phase.

In the case that the controller detects that the number of repetition times within the first synchronization cycle is less than the number threshold, step 3081 may be repeatedly performed. In the case that it is detected that the number of repetition times within the first synchronization cycle is greater than or equal to the number threshold, a complete clock calibration procedure shown in step 3084 or a complete clock calibration procedure shown in step 3085 to step 3086 is performed.

Figure 9:
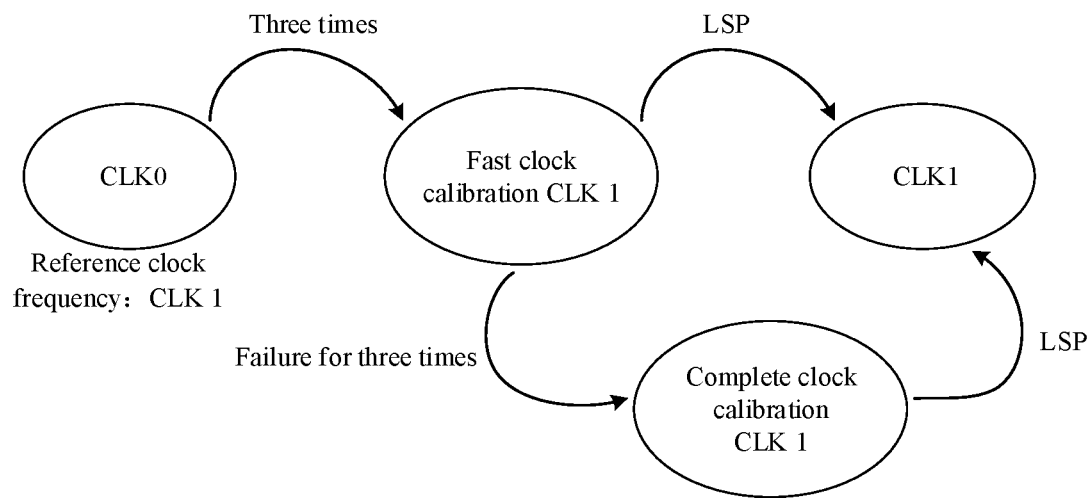
FIG. 9 is a schematic diagram of a clock calibration process according to an embodiment of the present disclosure.

In some embodiments, as shown in FIG. 6 and FIG. 9, it is assumed that the number threshold is 3, the controller may repeat the step of sending the clock calibration signal of the first target clock frequency shown in step 3081 for three times in the case of not receiving the first feedback signal from the target driving chip. The process of performing clock calibration by sending the clock calibration signal of the first target clock frequency shown in steps 3081 and 3082 may also be referred to as fast clock calibration.

In step 3084, the controller continuously sends the clock calibration signal of the first target clock frequency to the target driving chip until the first feedback signal is received.

In an optional embodiment, in the case that the controller fails to receive the first feedback signal from the target driving chip, and it is detected that the number of repetition times within the first synchronization cycle is greater than or equal to the number threshold, the controller may continuously send the clock calibration signal of the first target clock frequency to the target driving chip until the first feedback signal is received.

In some embodiments, in the case that the controller fails to receive the first feedback signal from the target driving chip, and it is detected that the number of repetition times within the first synchronization cycle is greater than the number threshold, the controller may continuously send a clock calibration signal with a clock frequency of 0.24 GHz to the target driving chip.

In step 3085, the controller sends the clock calibration signal of the first target clock frequency to the target driving chip within one second synchronization cycle.

As another optional embodiment, in the case that the controller fails to receive the first feedback signal from the target driving chip, and it is detected that the number of repetition times within the first synchronization cycle is greater than or equal to the number threshold, the controller may send the clock calibration signal of the first target clock frequency to the target driving chip within one second synchronization cycle. A duration of the second synchronization cycle is greater than the duration of the first synchronization cycle and less than the duration of the blanking phase.

In some embodiments, it is assumed that the duration of the second synchronization cycle is 500 μs, the controller may send a clock calibration signal with a clock frequency of 0.24 GHz to the target driving chip within the second synchronization cycle having a duration of 500 μs.

In step 3086, the controller determines whether the first feedback signal configured to indicate completion of calibration of the first target clock frequency is received from the target driving chip.

In the case that the second synchronization cycle ends, in response to failing to receive the first feedback signal from the target driving chip, the controller may continue to perform step 3085. In the case that the first feedback signal is received, the controller may perform step 311. That is, the controller may repeatedly perform the step of sending the clock calibration signal of the first target clock frequency within one second synchronization cycle until the first feedback signal is received.

It should be understood that, in response to failing to receive the first feedback signal in the case that the blanking phase ends, the controller may continue to perform the step of sending the dock calibration signal of the first target clock frequency within one second synchronization cycle until the first feedback signal is received.

It should also be understood that, there may be a time interval between every two adjacent second clock cycles. That is, the controller may wait for a period of time upon ending of one second synchronization cycle, and repeat the step of sending the clock calibration signal of the first target clock frequency within the next second synchronization cycle in the case that the first feedback signal is not received.

It should also be understood that, in step 3086, in the case that the controller fails to receive the first feedback signal from the target driving chip, the controller may also first detect whether the number of repetition times within the second synchronization cycle is greater than or equal to the number threshold. In the case that it is detected that the number of repetition times within the second synchronization cycle is less than the number threshold, step 3085 may be repeatedly performed. In the case that it is detected that the number of repetition times within the second synchronization cycle is greater than or equal to the number threshold, the controller may confirm that the target driving chip or a signal line connected to the target driving chip has a fault. Furthermore, the controller may report error information. For example, the controller may report the error information to a processor of the display device. The number threshold may be equal to or different from the number threshold in step 3083. For example, the number threshold may be 2.

In some embodiments, as shown in FIG. 9, it is assumed that the initial clock frequency is CLK0, and the first target clock frequency determined by the controller is CLLK1. Then, the controller may carry the reference clock frequency CLK1 in the configuration instruction sent to the target driving chip, such that the target driving chip selects a target clock calibration circuit whose configured frequency is equal to or close to the CLK1 to perform clock calibration.

In response to sending the configuration instruction, the controller may send a clock calibration signal with a clock frequency of CLK1 within one first synchronization cycle, such that the target driving chip performs fast clock calibration. In the case that the calibration by the target driving chip is not successful within the first synchronization cycle, the controller may repeat the step of sending the clock calibration signal with a clock frequency of CLK1 within one first synchronization cycle for three times. That is, the controller may perform the procedure of fast clock calibration for three times. In the case that the target driving chip completes the clock calibration by the three fast clock calibrations, the controller may send the LSP to the target driving chip to implement the scrambled resetting.

In the case that the target driving chip fails to complete the clock calibration upon completion of the three fast clock calibration procedure for three times, the controller may trigger the complete clock calibration procedure. In the case that the target driving chip completes the clock calibration by the complete clock calibration procedure, the controller may send the LSP to the target driving chip to implement the scrambled resetting. Correspondingly, in the next displaying phase, the controller may send the display data to the target driving chip based on the first target clock frequency CLK1.

It should be understood that, the sequence of the steps of the method for clock calibration according to embodiments of the present disclosure may be adjusted appropriately, and the steps may also be increased or decreased accordingly according to situations. For example, steps 305 to 307 may be canceled according to situations. In some embodiments, step 311 may also be canceled according to situations.

Within the technical scope disclosed in the present disclosure, any variations of the method easily derived by a skilled person familiar with the technical field shall be within the protection scope of the present disclosure, which is not repeated here.

In summary, embodiments of the present disclosure provide a method for clock calibration. The controller may send the configuration instruction carrying the reference frequency to the target driving chip, and the reference clock frequency may be equal to or close to the first target clock frequency corresponding to the target rate. Therefore, in the case that the target driving chip receives the clock calibration signal of the first target clock frequency, the clock calibration may be completed quickly, which improves the efficiency of clock calibration.

In addition, in some embodiments, the controller may set the reference clock frequency to be equal to or close to the second target clock frequency, such that the target driving chip may first adjust the local clock frequency to the second target clock frequency, and then adjust the second target clock frequency to the first target clock frequency. Therefore, it can be ensured that the driving chip can rapidly adjust the local clock frequency to the second target clock frequency, and also ensured that each time the driving chip performs clock calibration, a change amplitude of the clock frequency is relatively small, and a success rate of clock calibration is increased.

In addition, in the case that there is no clock calibration circuit whose configured clock frequency is equal to the first target clock frequency among the plurality of clock calibration circuits included in the target driving chip, the controller may select a clock frequency closest to the first target clock frequency as a second target clock frequency from clock frequencies configured for the plurality of clock calibration circuits. Therefore, the target driving chip may adjust the local clock frequency to the second target clock frequency, and then adjust the local clock frequency to the first target clock frequency. Based on the above implementation, there is no need to set too many clock calibration circuits in the driving chip, which reduces the design complexity of the driving circuit and saves the cost of the driving circuit. In addition, the problem of increased transmit power consumption caused by the controller sending the display data at a clock frequency slightly higher than the first target clock frequency because of the absence of a clock calibration circuit whose configured frequency is equal to or close to the first target clock frequency in the driving chip may be solved.

Figure 10:
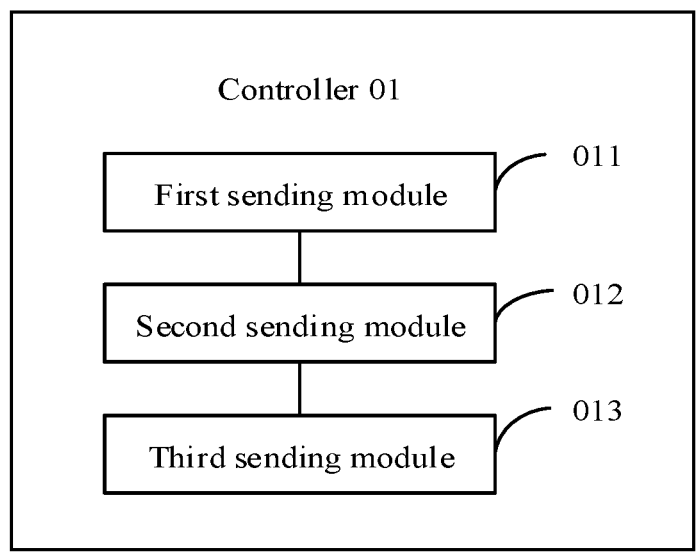
FIG. 10 is a schematic structural diagram of a controller according to an embodiment of the present disclosure.

FIG. 10 is a schematic structural diagram of a controller according to an embodiment of the present disclosure. The controller may be applicable to the display device shown in FIG. 1, and the controller may be configured to perform the steps performed by the controller in the method embodiments shown in FIG. 3 and FIG. 5.

As shown in FIG. 10, the controller 01 may include: a first sending module 011, configured to send display data to a target driving chip based on an initial clock frequency, the target driving chip including a plurality of clock calibration circuits, each of the clock calibration circuits being configured with one clock frequency; a second sending module 012, configured to send a configuration instruction to the target driving chip, the configuration instruction including a reference clock frequency; and a third sending module 013, configured to send a clock calibration signal of a first target clock frequency to the target driving chip, the first target clock frequency being different from the initial clock frequency.

The configuration instruction is configured to instruct the target driving chip to adjust a local clock frequency of the target driving chip to the first target clock frequency by a target clock calibration circuit; and a clock frequency configured for the target clock calibration circuit is equal to the reference clock frequency, or a difference between the clock frequency configured for the target clock calibration circuit and the reference clock frequency is less than a threshold.

In some embodiments, the third sending module 013 may be configured to send a clock calibration signal of the first target clock frequency to the target driving chip within one first synchronization cycle, and repeat the step of sending the clock calibration signal of the first target clock frequency within one first synchronization cycle in the case that a first feedback signal configured to indicate completion of calibration of the first target clock frequency is not received, until the first feedback signal is received from the target driving chip.

In some embodiments, the third sending module 013 may be configured to continuously send the clock calibration signal of the first target clock frequency to the target driving chip until the first feedback signal is received. Alternatively, the third sending module 013 may be configured to send the clock calibration signal of the first target clock frequency to the target driving chip within one second synchronization cycle, and repeat the step of sending the clock calibration signal of the first target clock frequency within one second synchronization cycle in the case that the first feedback signal from the target driving chip is not received, until the first feedback signal is received, wherein a length of the second synchronization cycle is greater than a length of the first synchronization cycle.

In some embodiments, the reference clock frequency is equal to the first target clock frequency.

In some embodiments, the third sending module 013 may also be configured to send a clock calibration signal of a second target clock frequency to the target driving chip prior to sending the clock calibration signal of the first target clock frequency to the target driving chip. The sending the clock calibration signal of the first target clock frequency to the target driving chip includes: sending the clock calibration signal of the first target clock frequency to the target driving chip in the case that the second feedback signal configured to indicate completion of calibration of the second target clock frequency is received from the target driving chip, wherein the initial clock frequency, the second target clock frequency, and the first target clock frequency are sequentially increased or decreased.

In some embodiments, a difference between the first target clock frequency and the second target clock frequency is equal to a difference between the second target clock frequency and the initial clock frequency.

In some embodiments, the reference clock frequency is equal to the second target clock frequency.

Figure 11:
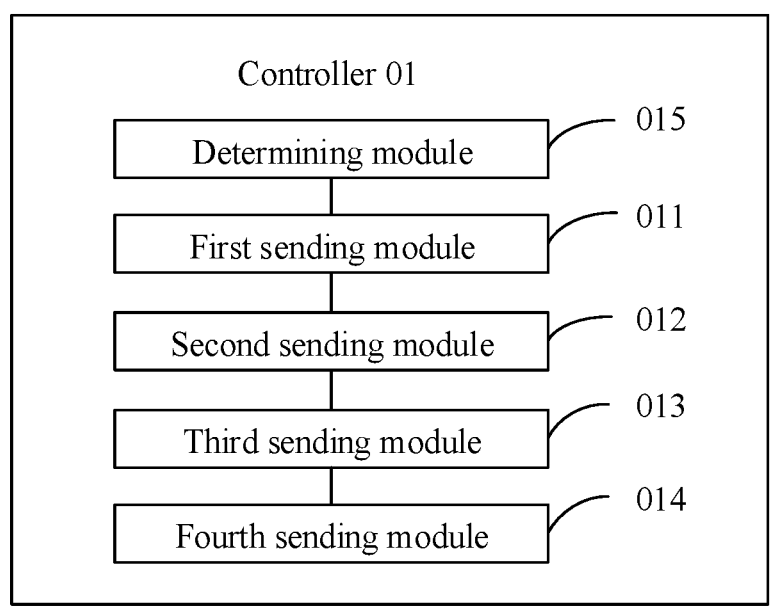
FIG. 11 is a schematic structural diagram of another controller according to an embodiment of the present disclosure.

In some embodiments, as shown in FIG. 11, the controller 01 may further include: a fourth sending module 014, configured to, in response to sending the clock calibration signal of the first target clock frequency to the target driving chip, send a link stable pattern to the target driving chip in the case that the first feedback signal configured to indicate completion of calibration of the first target clock frequency is received from the target driving chip.

In some embodiments, as shown in FIG. 11, the controller 01 may further include:

a determining module 015, configured to determine that a resolution and/or a refresh rate of a target display region in the display panel need/needs to be adjusted, and determine a driving chip configured to drive the target display region as the target driving chip.

In some embodiments, the display data includes a plurality of rows of pixel data corresponding to a plurality of rows of pixels one by one. The first sending module 011 may be configured to: send the pixel data to the target driving chip row by row based on the initial clock frequency in a displaying phase.

The second sending module 012 may be configured to send a configuration instruction to the target driving chip in the displaying phase in response to sending the pixel data in the last row.

The third sending module 013 may be configured to send a clock calibration signal of the target clock frequency to the target driving chip in a blanking phase upon the displaying phase.

In summary, this embodiment of the present disclosure provides a controller. Since the controller may send the configuration instruction carrying the reference frequency to the target driving chip, the reference clock frequency may be equal to or close to the first target clock frequency corresponding to the target rate. Therefore, in the case that the target driving chip receives the clock calibration signal of the first target clock frequency, the clock calibration may be completed quickly, which improves the efficiency of clock calibration.

In addition, in this embodiment, the controller may set the reference clock frequency to be equal to or close to the second target clock frequency, such that the target driving chip may adjust the local clock frequency to the second target clock frequency, and then adjust the second target clock frequency to the first target clock frequency. Therefore, it can be ensured that the driving chip can rapidly adjust the local clock frequency to the second target clock frequency, and also ensured that each time the driving chip performs clock calibration, a change amplitude of the clock frequency is relatively small, and a success rate of clock calibration is increased.

Figure 12:
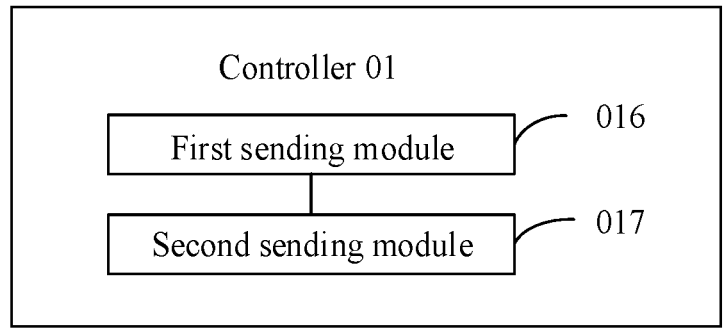
FIG. 12 is a schematic structural diagram of yet another controller according to an embodiment of the present disclosure.

FIG. 12 is a schematic structural diagram of another controller according to an embodiment of the present disclosure. The controller may be applicable to the display device shown in FIG. 1, and the controller may be configured to perform the steps performed by the controller in the method embodiment shown in FIG. 4.

As shown in FIG. 12, the controller 01 may include: a first sending module 016, configured to send display data to a target driving chip based on an initial clock frequency; and a second sending module 017, configured to send a clock calibration signal of a second target clock frequency to the target driving chip.

The second sending module 017 is further configured to send the clock calibration signal of the first target clock frequency to the target driving chip in the case that a feedback signal configured to indicate completion of calibration of the second target clock frequency is received from the target driving chip.

The initial clock frequency, the second target clock frequency, and the first target clock frequency are sequentially increased or decreased.

In summary, this embodiment of the present disclosure provides a controller. During the process of clock calibration, the controller may transmit clock calibration signals of different target frequencies for a plurality of times, and the clock frequencies of the clock calibration signals transmitted for the plurality of times may be sequentially increased or decreased. Therefore, it can be ensured that each time the driving chip performs clock calibration, a change amplitude of the clock frequency is relatively small, and a success rate of clock calibration is increased.

Figure 13:
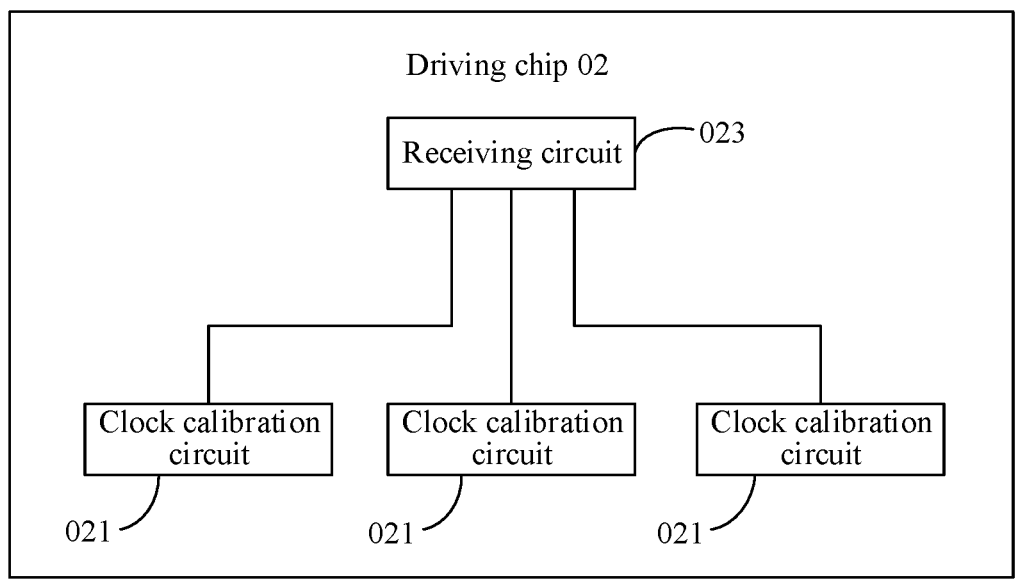
FIG. 13 is a schematic structural diagram of a driving chip according to an embodiment of the present disclosure.

FIG. 13 is a schematic structural diagram of a driving chip according to an embodiment of the present disclosure. The driving chip may be applicable to the display device shown in FIG. 1, and the driving chip may be configured to perform the steps performed by the driving chip in the method embodiments shown in FIG. 3 and FIG. 5. As shown in FIG. 13, the driving chip 02 includes a plurality of clock calibration circuits 021 and a receiving circuit 023, wherein each of the clock calibration circuits 021 is configured with one clock frequency.

The receiving circuit 023 may be configured to: receive display data from a controller based on an initial clock frequency; receive a configuration instruction from the controller, the configuration instruction including a reference clock frequency; and receive a clock calibration signal of a target clock frequency from the controller, the target clock frequency being different from the initial clock frequency.

A target clock calibration circuit in the plurality of clock calibration circuits 021 is configured to adjust a local clock frequency of the target driving chip to the target clock frequency, and a difference between a clock frequency configured for the target clock calibration circuit and the reference clock frequency is less than a difference between a clock frequency configured for other clock calibration circuits in the target driving chip and the reference clock frequency.

Figure 14:
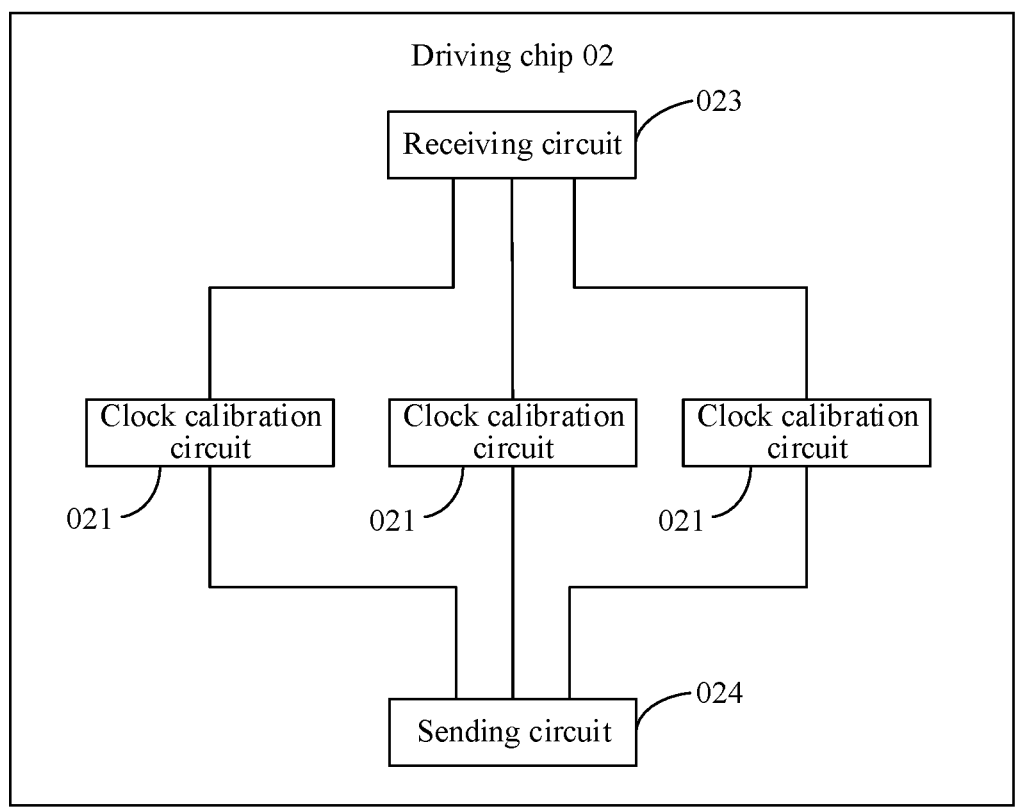
FIG. 14 is a schematic structural diagram of another driving chip according to an embodiment of the present disclosure.

In some embodiments, as shown in FIG. 14, the driving chip 02 may also include a sending circuit 024. The sending circuit 024 may be configured to send to the controller a feedback signal configured to indicate completion of clock calibration in response to adjusting the local clock frequency of the driving chip to the target clock frequency.

In summary, this embodiment of the present disclosure provides a driving chip. The driving chip includes a plurality of clock calibration circuits, wherein each of the clock calibration circuits is configured with one clock frequency. Therefore, prior to sending a clock calibration signal, the controller may send a reference clock frequency to the driving chip over a configuration instruction, such that this driving chip may determine a target clock calibration circuit for clock calibration based on the configuration instruction. In this embodiment of the present disclosure, the reference clock frequency may be set as a clock frequency equal to or close to the first target clock frequency, so as to ensure that the target clock calibration circuit can start clock calibration from a clock frequency equal to or close to the first target clock frequency. Therefore, the clock calibration can be completed rapidly to improve the efficiency of clock calibration, and meet the requirements of a display device with a high refresh rate.

Figure 15:
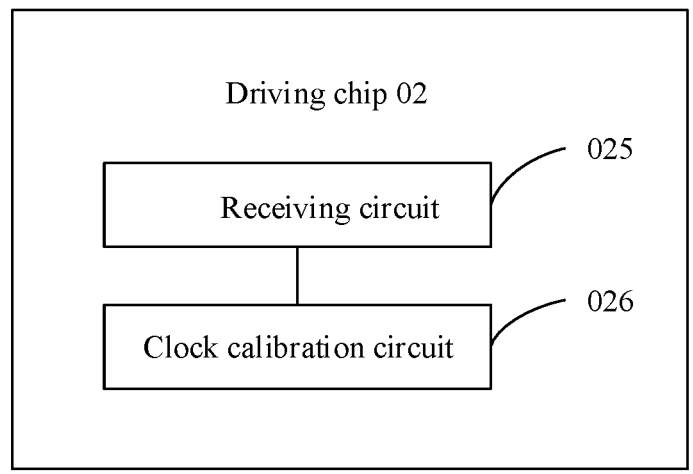
FIG. 15 is a schematic structural diagram of yet another driving chip according to an embodiment of the present disclosure.

FIG. 15 is a schematic structural diagram of yet another driving chip according to an embodiment of the present disclosure. The driving chip may be applicable to the display device shown in FIG. 1, and the driving chip may be configured to perform the steps performed by the driving chip in the method embodiment shown in FIG. 4.

As shown in FIG. 15, the driving chip includes: a receiving circuit 025, configured to receive display data from the controller based on an initial clock frequency; and further configured to receive a clock calibration signal of a target clock frequency from the controller, the target clock frequency being different from the initial clock frequency; and a clock calibration circuit 026 configured to adjust a local clock frequency of the driving chip from the initial clock frequency to the target clock frequency in the case that a duration for receiving the clock calibration signal reaches a target duration, and a fluctuation amplitude of the clock frequency of the clock calibration signal relative to the target clock frequency is less than an amplitude threshold within the target duration.

In summary, this embodiment of the present disclosure provides a driving chip. In response to receiving a clock calibration signal of a target clock frequency that is different from the initial clock frequency that has been calibrated, the driving chip may, in response to detecting that the clock calibration signal is a stable clock signal, directly perform clock calibration on its local clock frequency based on the clock calibration signal. Compared with a technical solution in the related art in which a clock is directly determined to be loss-of-lock and a loss-of-lock signal is fed back to the controller, the method provided in this embodiment of the present disclosure can effectively improve the efficiency of clock calibration.

Those skilled in the art can clearly understand that, for the convenience and conciseness of the description, for the specific operating process of the controller, the driving chip, and respective modules and circuits as described above, reference may be made to the corresponding process in the above method embodiments, which are not repeated herein.

Figure 16:
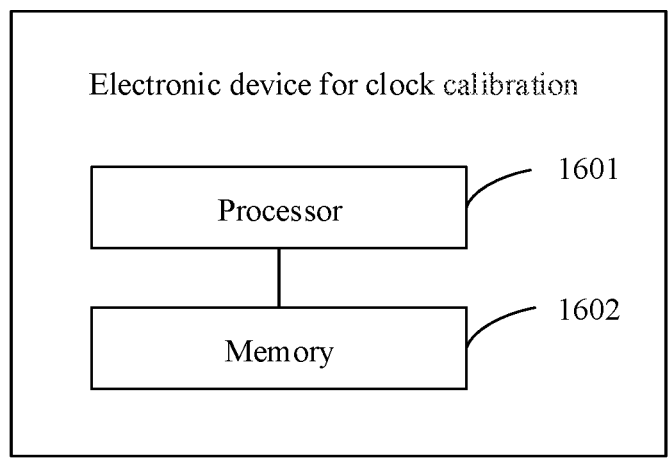
FIG. 16 is a schematic structural diagram of an electronic device for clock calibration according to an embodiment of the present disclosure.

As shown in FIG. 16, an embodiment of the present disclosure provides an electronic device for clock calibration. The electronic device may include a processor 1601, and a memory 1602 configured to store one or more instructions executable by the processor 1601. The processor, when loading and executing the one or more instructions, is caused to perform the steps performed by the controller or the steps performed by the driving chip in the foregoing embodiments.

Referring to FIG. 1 and FIG. 7, an embodiment of the present disclosure further provides a display device. The display device includes a display panel 03, a plurality of driving chips 02 connected to the display panel 03, and a controller 01 connected to the plurality of driving chips 02.

The controller 01 may be any one of the controllers shown in FIGS. 10 to 12, and at least one driving chip 02 of the plurality of driving chips 02 may be any one of the driving chip shown in FIG. 2 and FIGS. 13 to 15.

In some embodiments, the display device may be any product or component having display function, such as a liquid crystal display device, electronic paper, an OLED display device, a mobile phone, a tablet computer, a television, a display, a notebook computer, a digital photo frame, a navigator or the like.

An embodiment of the present disclosure provides a non-transitory computer-readable storage medium configured to store one or more instructions therein. The one or more instructions, when loaded and executed by a processor, cause the processor to perform the steps performed by the controller in the foregoing embodiments, or the steps performed by the driving chip.

In the present application, the terms "first" and "second" are used for descriptive purposes only and are not to be understood as indicating or implying relative importance. The term "at least one" means one or more, and the term "plurality" in the present disclosure means two or more. For example, a plurality of clock calibration circuits refers to two or more clock calibration circuits.

It should be understood that, the term"and/or" in the present disclosure indicates three kinds of relationships. For example, A and/or B, can be expressed as: A exists alone, A and B exist concurrently, B exists alone. The symbol "/" generally indicates an "or" relationship between the contextual objects.

The foregoing descriptions are merely exemplary embodiments of the present disclosure, and are not intended to limit the present disclosure. Within the spirit and principles of the present disclosure, any modification, equivalent substitution, improvement, and the like should be within the protection scope of the present disclosure.

What is claimed is:

1. A method for clock calibration, applicable to a controller, the method comprising:
sending display data to a target driving chip based on an initial clock frequency, the target driving chip comprising a plurality of clock calibration circuits, each of the clock calibration circuits being configured with one clock frequency;
sending a configuration instruction to the target driving chip, the configuration instruction comprising a reference clock frequency; and
sending a clock calibration signal of a first target clock frequency to the target driving chip, the first target clock frequency being different from the initial clock frequency, wherein
the configuration instruction is configured to instruct the target driving chip to adjust a local clock frequency of the target driving chip to the first target clock frequency by a target clock calibration circuit, and a difference between a clock frequency configured for the target clock calibration circuit and the reference clock frequency is less than a difference between a clock frequency configured for other clock calibration circuits in the target driving chip and the reference clock frequency.

2. The method according to claim 1, wherein sending the clock calibration signal of the first target clock frequency to the target driving chip comprises:
sending the clock calibration signal of the first target clock frequency to the target driving chip within one first synchronization cycle; and
repeating the step of sending the clock calibration signal of the first target clock frequency within one first synchronization cycle in the case that a first feedback signal configured to indicate completion of calibration of the first target clock frequency is not received, until the first feedback signal is received from the target driving chip.

3. The method according to claim 2, wherein in the case that a number of repetition times within the first synchronization cycle is greater than a number threshold, the method further comprises:
continuously sending the clock calibration signal of the first target clock frequency to the target driving chip until the first feedback signal is received.

4. The method according to claim 2, wherein in the case that the number of repetition times within the first synchronization cycle is greater than the number threshold, the method further comprises:
sending the clock calibration signal of the first target clock frequency to the target driving chip within one second synchronization cycle, and repeating the step of sending the clock calibration signal of the first target clock frequency within the second synchronization cycle in the case that the first feedback signal from the target driving chip is not received, until the first feedback signal is received, wherein a length of the second synchronization cycle is greater than a length of the first synchronization cycle.

5. The method according to claim 1, wherein the reference clock frequency is equal to the first target clock frequency.

6. The method according to claim 1, wherein
prior to sending the clock calibration signal of the first target clock frequency to the target driving chip, the method further comprises:
sending a clock calibration signal of a second target clock frequency to the target driving chip; and
sending the clock calibration signal of the first target clock frequency to the target driving chip comprises:
sending the clock calibration signal of the first target clock frequency to the target driving chip in the case that a second feedback signal configured to indicate completion of calibration of the second target clock frequency is received from the target driving chip, wherein
the initial clock frequency, the second target clock frequency, and the first target clock frequency are sequentially increased or decreased.

7. The method according to claim 6, wherein a difference between the first target clock frequency and the second target clock frequency is equal to a difference between the second target clock frequency and the initial clock frequency.

8. The method according to claim 6, wherein the reference clock frequency is equal to the second target clock frequency.

9. The method according to claim 1, wherein in response to sending the clock calibration signal of the first target clock frequency to the target driving chip, the method further comprises:
sending a link stable pattern to the target driving chip in the case that the first feedback signal configured to indicate completion of calibration of the first target clock frequency is received from the target driving chip.

10. The method according to claim 1, wherein
the controller is connected to a plurality of driving chips which are connected to a display panel, each of the driving chips being configured to drive a display region in the display panel; and
the method further comprises:
determining that a resolution and/or a refresh rate of a target display region in the display panel need/needs to be adjusted; and
determining a driving chip configured to drive the target display region as the target driving chip.

11. The method according to claim 1, wherein
the display data comprises a plurality of rows of pixel data corresponding to a plurality of rows of pixels one by one;
sending the display data to the target driving chip based on the initial clock frequency comprises:
sending the pixel data to the target driving chip row by row based on the initial clock frequency in a displaying phase;
sending the configuration instruction to the target driving chip comprises:
sending the configuration instruction to the target driving chip in response to sending pixel data in the last row in the displaying phase; and
sending the clock calibration signal of the first target clock frequency to the target driving chip comprises:

sending the clock calibration signal of the first target clock frequency to the target driving chip in a blanking phase upon the displaying phase.

12. The method according to claim 4, wherein
the controller is connected to a plurality of driving chips which are connected to a display panel, each of the driving chips being configured to drive a display region in the display panel; and
the method further comprises:
  determining that a resolution and/or a refresh rate of a target display region in the display panel need/needs to be adjusted; and
  determining a driving chip configured to drive the target display region as the target driving chip;
prior to sending the clock calibration signal of the first target clock frequency to the target driving chip, the method further comprises:
  sending a clock calibration signal of a second target clock frequency to the target driving chip, wherein a difference between the first target clock frequency and the second target clock frequency is equal to a difference between the second target clock frequency and the initial clock frequency, and the reference clock frequency is equal to the second target clock frequency;
sending the clock calibration signal of the first target clock frequency to the target driving chip comprises:
  sending the clock calibration signal of the first target clock frequency to the target driving chip in the case that a second feedback signal configured to indicate completion of calibration of the second target clock frequency is received from the target driving chip; and
in response to sending the clock calibration signal of the first target clock frequency to the target driving chip, the method further comprises:
  sending a link stable pattern to the target driving chip in the case that the first feedback signal configured to indicate completion of calibration of the first target clock frequency is received from the target driving chip;
the display data comprises a plurality of rows of pixel data corresponding to a plurality of rows of pixels one by one; and sending the display data to the target driving chip based on the initial clock frequency comprises:
  sending the pixel data to the target driving chip row by row based on the initial clock frequency in a displaying phase;
sending the configuration instruction to the target driving chip comprises:
  sending the configuration instruction to the target driving chip in the displaying phase in response to sending the pixel data in the last row; and
sending the clock calibration signal of the first target clock frequency to the target driving chip comprises:
  sending the clock calibration signal of the first target clock frequency to the target driving chip in a blanking phase upon the displaying phase.

13. A method for clock calibration, applicable to a driving chip, the driving chip comprising a plurality of clock calibration circuits, each of the clock calibration circuits being configured with one clock frequency,
the method comprising:
  receiving display data from a controller based on an initial clock frequency;
  receiving a configuration instruction from the controller, the configuration instruction comprising a reference clock frequency;
  receiving a clock calibration signal of a target clock frequency from the controller, the target clock frequency being different from the initial clock frequency; and
  adjusting a local clock frequency of the driving chip to the target clock frequency by a target clock calibration circuit, wherein a difference between a clock frequency configured for the target clock calibration circuit and the reference clock frequency is less than a difference between a clock frequency configured for other clock calibration circuits in the driving chip and the reference clock frequency.

14. The method according to claim 13, wherein in response to adjusting the local clock frequency of the driving chip to the target clock frequency, the method further comprises:
  sending to the controller a feedback signal configured to indicate completion of clock calibration.

15. A controller configured to perform the method according to claim 1.

16. The controller according to claim 15, wherein
the controller is further configured to:
  send a clock calibration signal of a second target clock frequency to the target driving chip prior to sending the clock calibration signal of the first target clock frequency to the target driving chip; and
sending the clock calibration signal of the first target clock frequency to the target driving chip comprises:
  sending the clock calibration signal of the first target clock frequency to the target driving chip in the case that a second feedback signal configured to indicate completion of calibration of the second target clock frequency is received from the target driving chip, wherein
  the initial clock frequency, the second target clock frequency, and the first target clock frequency are sequentially increased or decreased.

17. A driving chip, comprising a receiving circuit, and a plurality of clock calibration circuits, wherein each of the clock calibration circuits is configured with one clock frequency; and the receiving circuit is configured to perform the method as defined in claim 13.

18. A display device, comprising a display panel, a plurality of driving chips connected to the display panel, and a controller connected to the plurality of driving chips, wherein
the controller is configured to:
  send display data to a target driving chip in the plurality of driving chips based on an initial clock frequency, the target driving chip comprising a plurality of clock calibration circuits, each of the clock calibration circuits being configured with one clock frequency;
  send a configuration instruction to the target driving chip, the configuration instruction comprising a reference clock frequency; and
  send a clock calibration signal of a first target clock frequency to the target driving chip, the first target clock frequency being different from the initial clock frequency, wherein the configuration instruction is configured to instruct the target driving chip to adjust a local clock frequency of the target driving chip to the first target clock frequency by a target clock calibration circuit, and a difference between a clock frequency configured for the target clock calibration circuit and the reference clock frequency is less than a difference between a clock frequency configured for other clock calibration circuits in the target driving chip and the reference clock frequency; and the target driving chip is configured to:
- receive the display data from the controller based on the initial clock frequency;
- receive the configuration instruction from the controller, the configuration instruction comprising the reference clock frequency;
- receive the clock calibration signal of the target clock frequency from the controller, the target clock frequency being different from the initial clock frequency; and
- adjust a local clock frequency of the target driving chip to the target clock frequency by the target clock calibration circuit.

19. A non-transitory computer-readable storage medium storing one or more instructions, wherein the one or more instructions, when loaded and executed by a processor of an electronic device, cause the electronic device to perform the method for clock calibration according to claim 1.

20. A non-transitory computer-readable storage medium storing one or more instructions, wherein the one or more instructions, when loaded and executed by a processor of an electronic device, cause the electronic device to perform the method for clock calibration according to claim 13.

* * * * *